US012655057B2

(12) United States Patent
Click et al.

(10) Patent No.: US 12,655,057 B2
(45) Date of Patent: Jun. 16, 2026

(54) GLASS-CERAMIC ARTICLES WITH INCREASED RESISTANCE TO FRACTURE AND METHODS FOR MAKING THE SAME

(71) Applicant: CORNING INCORPORATED, Corning, NY (US)

(72) Inventors: Carol Ann Click, Corning, NY (US); Indrajit Dutta, Horseheads, NY (US); James Howard Edmonston, Durham, NC (US); Michael S Fischer, Brockport, NY (US); Qiang Fu, Painted Post, NY (US); Ozgur Gulbiten, Painted Post, NY (US); Jill Marie Hall, Elmira, NY (US); Mathieu Gerard Jacques Hubert, Corning, NY (US); Dhananjay Joshi, Rockville, MD (US); Andrew Peter Kittleson, Honeoye Falls, NY (US); Rohit Rai, Lexington, MA (US); John Robert Saltzer, Jr., Beaver Dams, NY (US); Charlene Marie Smith, Corning, NY (US); Matthew Daniel Trosa, Horseheads, NY (US); Matthew Artus Tuggle, Seattle, WA (US); James Clark Walck, Jr., Sayre, PA (US); Alana Marie Whittier, Painted Post, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/341,229

(22) Filed: Sep. 26, 2025

(65) Prior Publication Data

US 2026/0022057 A1     Jan. 22, 2026

Related U.S. Application Data

(63) Continuation of application No. 16/512,953, filed on Jul. 16, 2019.

(Continued)

(51) Int. Cl.
*C03C 10/00*       (2006.01)
*C03B 32/02*       (2006.01)
(Continued)

(52) U.S. Cl.
CPC .......... *C03C 10/0036* (2013.01); *C03B 32/02* (2013.01); *C03C 4/0092* (2013.01);
(Continued)

(58) Field of Classification Search
None
See application file for complete search history.

(56) References Cited

U.S. PATENT DOCUMENTS 2,920,971 A     1/1960   Stookey
3,129,087 A     4/1964   Hagy
(Continued)

FOREIGN PATENT DOCUMENTS

CN        1367149 A      9/2002
CN        1575265 A      2/2005
(Continued)

OTHER PUBLICATIONS

Beall et al; "High Strength Glass-Ceramics Having Petalite and Lithium Silicate Structures"; Filed as U.S. Appl. No. 62/205,120, filed Aug. 14, 2015; 69 Pages.
(Continued)

*Primary Examiner* — David Sample
(74) *Attorney, Agent, or Firm* — Russell S. Magaziner

(57)        ABSTRACT

A glass-ceramic article having one or more crystalline phases; a residual glass phase; a compressive stress layer
(Continued)

extending from a first surface to a depth of compression (DOC); a maximum central tension greater than 70 MPa; a stored tensile energy greater than 22 $J/m^2$; a fracture toughness greater than 1.0 $MPa\sqrt{m}$; and a haze less than 0.2.

20 Claims, 8 Drawing Sheets

Related U.S. Application Data

(60) Provisional application No. 62/736,682, filed on Sep. 26, 2018, provisional application No. 62/698,532, filed on Jul. 16, 2018.

(51) Int. Cl.
    *C03C 3/097*       (2006.01)
    *C03C 4/00*        (2006.01)
    *C03C 21/00*      (2006.01)

(52) U.S. Cl.
    CPC .......... *C03C 10/0027* (2013.01); *C03C 3/097* (2013.01); *C03C 10/0054* (2013.01); *C03C 21/002* (2013.01); *C03C 2203/52* (2013.01); *C03C 2214/20* (2013.01)

(56) References Cited

U.S. PATENT DOCUMENTS

| | | |
|---|---|---|
| 3,617,317 A | 11/1971 | Sack et al. |
| 3,809,543 A | 5/1974 | Gaskell et al. |
| 3,809,599 A | 5/1974 | Pei |
| 3,817,732 A | 6/1974 | Pei |
| 3,931,438 A | 1/1976 | Beall et al. |
| 3,972,704 A | 8/1976 | Loxley et al. |
| 4,042,362 A | 8/1977 | MacDowell et al. |
| 4,191,583 A | 3/1980 | Armistead et al. |
| 4,219,344 A | 8/1980 | Armistead et al. |
| 4,222,760 A | 9/1980 | Chyung et al. |
| 4,248,925 A | 2/1981 | Ambrogi |
| 4,274,857 A | 6/1981 | Wolfe |
| 4,340,436 A | 7/1982 | Dubetsky et al. |
| 4,391,914 A | 7/1983 | Beall |
| 4,786,305 A | 11/1988 | Ball et al. |
| 4,910,638 A | 3/1990 | Berghout et al. |
| 4,940,674 A | 7/1990 | Beall et al. |
| 5,030,433 A | 7/1991 | Mehrotra |
| 5,073,181 A | 12/1991 | Foster et al. |
| 5,082,710 A | 1/1992 | Wright |
| 5,147,436 A | 9/1992 | Blakeslee et al. |
| 5,168,193 A | 12/1992 | Hoegler |
| 5,296,294 A | 3/1994 | Suzuki et al. |
| 5,389,582 A | 2/1995 | Loxley et al. |
| 5,588,979 A | 12/1996 | Miyazaki et al. |
| 5,603,147 A | 2/1997 | Bischoff et al. |
| 5,680,685 A | 10/1997 | Bischoff |
| 5,788,731 A | 8/1998 | Suzuki et al. |
| 5,814,262 A | 9/1998 | Ketcham et al. |
| 5,836,760 A | 11/1998 | Turner et al. |
| 5,840,221 A | 11/1998 | Lau et al. |
| 5,872,069 A | 2/1999 | Abe |
| 6,055,151 A | 4/2000 | Tormey et al. |
| 6,374,640 B1 | 4/2002 | Fotheringham et al. |
| 6,408,813 B1 | 6/2002 | Wilksch et al. |
| 6,409,813 B1 | 6/2002 | Beesabathina et al. |
| 6,410,892 B1 | 6/2002 | Perschl et al. |
| 6,852,569 B2 | 2/2005 | Nakano et al. |
| 7,054,136 B2 | 5/2006 | Ritter et al. |
| 7,125,320 B1 | 10/2006 | Brown et al. |
| 7,312,154 B2 | 12/2007 | Cites et al. |
| 7,410,716 B2 | 8/2008 | Garner et al. |
| 7,589,038 B2 | 9/2009 | Goto et al. |
| 7,618,843 B2 | 11/2009 | Nakano et al. |
| 8,854,623 B2 | 10/2014 | Fontaine et al. |
| 9,126,859 B2 | 9/2015 | Nakane et al. |
| 9,156,726 B2 | 10/2015 | Katayama et al. |
| 9,260,337 B2 | 2/2016 | Abramov et al. |
| 9,260,342 B2 | 2/2016 | Borczuch-Laczka et al. |
| 9,382,603 B2 | 7/2016 | Kimura et al. |
| 9,604,871 B2 | 3/2017 | Amin et al. |
| 9,701,569 B2 | 7/2017 | Demartino et al. |
| 9,809,488 B2 | 11/2017 | Beall et al. |
| 9,862,633 B2 | 1/2018 | Gabel et al. |
| 10,046,542 B2 | 8/2018 | Adib et al. |
| 2001/0022705 A1 | 9/2001 | Mori et al. |
| 2003/0100146 A1 | 5/2003 | Nakano et al. |
| 2003/0126802 A1 | 7/2003 | Rosenflanz |
| 2004/0053039 A1 | 3/2004 | Ekstrom et al. |
| 2004/0149368 A1 | 8/2004 | Wang et al. |
| 2005/0016214 A1 | 1/2005 | Hsu et al. |
| 2005/0095404 A1 | 5/2005 | Schillert et al. |
| 2005/0199331 A1 | 9/2005 | Nakano et al. |
| 2006/0026994 A1 | 2/2006 | Yoshizawa |
| 2006/0068112 A1 | 3/2006 | Chapman et al. |
| 2006/0093884 A1 | 5/2006 | Seabaugh et al. |
| 2006/0185335 A1 | 8/2006 | Ichikawa |
| 2006/0199013 A1 | 9/2006 | Malshe et al. |
| 2007/0051301 A1 | 3/2007 | Hirooka |
| 2007/0154666 A1 | 7/2007 | Coonan et al. |
| 2007/0199348 A1 | 8/2007 | Gudgel et al. |
| 2008/0041107 A1 | 2/2008 | Hsu et al. |
| 2008/0248316 A1 | 10/2008 | Goto et al. |
| 2009/0162608 A1 | 6/2009 | Yagi et al. |
| 2009/0186489 A1 | 7/2009 | Nakamura et al. |
| 2009/0323157 A1 | 12/2009 | Valentin et al. |
| 2010/0011814 A1 | 1/2010 | Zou et al. |
| 2010/0069218 A1 | 3/2010 | Baldi et al. |
| 2010/0116413 A1 | 5/2010 | Tanaka et al. |
| 2010/0304953 A1 | 12/2010 | Liu et al. |
| 2011/0009254 A1 | 1/2011 | Schweiger et al. |
| 2011/0092353 A1 | 4/2011 | Amin et al. |
| 2011/0135964 A1 | 6/2011 | Yagi et al. |
| 2011/0176277 A1 | 7/2011 | Kaga et al. |
| 2011/0186431 A1 | 8/2011 | Horisaka et al. |
| 2011/0189440 A1 | 8/2011 | Appleby et al. |
| 2011/0198785 A1 | 8/2011 | Kester et al. |
| 2012/0094079 A1 | 4/2012 | Gabel et al. |
| 2012/0196735 A1 | 8/2012 | Bogaerts et al. |
| 2012/0291493 A1 | 11/2012 | Hsu et al. |
| 2013/0164509 A1 | 6/2013 | Siebers et al. |
| 2013/0224493 A1 | 8/2013 | Gabel et al. |
| 2013/0277613 A1 | 10/2013 | Miyagawa et al. |
| 2013/0295523 A1 | 11/2013 | Durschang et al. |
| 2013/0338267 A1 | 12/2013 | Appleby et al. |
| 2014/0050659 A1 | 2/2014 | Rimer et al. |
| 2014/0066285 A1 | 3/2014 | Beall et al. |
| 2014/0124777 A1 | 5/2014 | Nakatani et al. |
| 2014/0134397 A1 | 5/2014 | Amin et al. |
| 2014/0141285 A1 | 5/2014 | Momono et al. |
| 2014/0141960 A1 | 5/2014 | Borczuch-Laczka et al. |
| 2014/0309793 A1 | 10/2014 | Cheng et al. |
| 2014/0345328 A1 | 11/2014 | Folgar |
| 2015/0064474 A1 | 3/2015 | Dejneka et al. |
| 2015/0086794 A1 | 3/2015 | Akita et al. |
| 2015/0099124 A1 | 4/2015 | Beunet et al. |
| 2015/0113801 A1 | 4/2015 | Cao et al. |
| 2015/0140274 A1 | 5/2015 | Burke et al. |
| 2015/0140513 A1 | 5/2015 | Burke et al. |
| 2015/0210029 A1 | 7/2015 | Makino et al. |
| 2015/0239772 A1 | 8/2015 | Baker et al. |
| 2015/0265975 A1 | 9/2015 | Liu et al. |
| 2015/0274581 A1 | 10/2015 | Beall et al. |
| 2015/0274602 A1 | 10/2015 | Ishii et al. |
| 2015/0291468 A1 | 10/2015 | Boek et al. |
| 2015/0329413 A1 | 11/2015 | Beall et al. |
| 2015/0376055 A1 | 12/2015 | Fu et al. |
| 2016/0002092 A1 | 1/2016 | Kuehn |
| 2016/0031736 A1 | 2/2016 | Muehlke et al. |
| 2016/0046520 A1 | 2/2016 | Chenu et al. |
| 2016/0102010 A1* | 4/2016 | Beall .................... C03C 3/097 501/4 |
| 2016/0102014 A1 | 4/2016 | Hu et al. |
| 2016/0130175 A1 | 5/2016 | Siebers et al. |

(56) References Cited

U.S. PATENT DOCUMENTS

| | | | |
|---|---|---|---|
| 2016/0159682 A1 | 6/2016 | Borczuch-Laczka et al. | |
| 2016/0176752 A1 | 6/2016 | Gabel et al. | |
| 2016/0194235 A1 | 7/2016 | Hart et al. | |
| 2016/0236970 A1 | 8/2016 | Beall et al. | |
| 2016/0280589 A1 | 9/2016 | Beall et al. | |
| 2017/0022093 A1* | 1/2017 | DeMartino | C03C 3/085 |
| 2017/0144921 A1 | 5/2017 | Beall et al. | |
| 2017/0340420 A1 | 11/2017 | Burke et al. | |
| 2018/0002227 A1 | 1/2018 | Dai et al. | |
| 2018/0097142 A1 | 4/2018 | Moriyama et al. | |
| 2018/0099899 A1 | 4/2018 | Ritzberger et al. | |
| 2018/0155235 A1 | 6/2018 | Beall et al. | |
| 2018/0169826 A1 | 6/2018 | Bankaitis et al. | |
| 2018/0182549 A1 | 6/2018 | Koide et al. | |
| 2018/0210118 A1 | 7/2018 | Gollier et al. | |
| 2018/0272783 A1 | 9/2018 | Ishihara | |
| 2018/0362390 A1 | 12/2018 | Claireaux et al. | |
| 2018/0370194 A1 | 12/2018 | Claireaux et al. | |
| 2018/0370846 A1 | 12/2018 | Harrison et al. | |
| 2019/0169060 A1 | 6/2019 | Jones et al. | |
| 2019/0169061 A1 | 6/2019 | Jones et al. | |
| 2019/0194062 A1 | 6/2019 | Wlfinger et al. | |
| 2019/0300426 A1 | 10/2019 | Fu et al. | |
| 2020/0017398 A1* | 1/2020 | Click | C03C 4/18 |
| 2020/0017399 A1 | 1/2020 | Click et al. | |
| 2020/0156994 A1 | 5/2020 | Li et al. | |
| 2020/0263317 A1 | 8/2020 | Mori et al. | |
| 2021/0032151 A1* | 2/2021 | Rai | C03C 21/002 |
| 2022/0267205 A1 | 8/2022 | Chien et al. | |

FOREIGN PATENT DOCUMENTS

| | | | |
|---|---|---|---|
| CN | 101714504 A | 5/2010 | |
| CN | 101962295 A | 2/2011 | |
| CN | 102384654 A | 3/2012 | |
| CN | 103003212 A | 3/2013 | |
| CN | 105731808 A | 7/2016 | |
| CN | 105753314 A | 7/2016 | |
| CN | 105884184 A | 8/2016 | |
| CN | 105899469 A | 8/2016 | |
| CN | 106660861 A | 5/2017 | |
| CN | 107001120 A | 8/2017 | |
| CN | 107265845 A | 10/2017 | |
| CN | 206580739 U | 10/2017 | |
| CN | 206683413 U | 11/2017 | |
| CN | 107619193 A | 1/2018 | |
| CN | 107902909 A | 4/2018 | |
| CN | 109071316 A | 12/2018 | |
| CN | 111954646 A | 11/2020 | |
| CN | 113896410 A | 1/2022 | |
| DE | 102010027461 A1 | 1/2012 | |
| DE | 102016111438 A1 | 12/2017 | |
| DE | 202018102534 U1 | 5/2018 | |
| EP | 0508131 A2 | 10/1992 | |
| EP | 2323955 A1 | 5/2011 | |
| EP | 2905113 A1 | 8/2015 | |
| EP | 3293157 A1 | 3/2018 | |
| JP | 62-070239 A | 3/1987 | |
| JP | 02-116639 A | 5/1990 | |
| JP | 05-043263 A | 2/1993 | |
| JP | 05-032334 | 5/1993 | |
| JP | 2000-072489 A | 3/2000 | |
| JP | 2001-097740 A | 4/2001 | |
| JP | 2002-087835 A | 3/2002 | |
| JP | 2006-232661 A | 9/2006 | |
| JP | 2008-303073 A | 12/2008 | |
| JP | 4305602 B2 | 7/2009 | |
| JP | 2014-012617 A | 1/2014 | |
| JP | 2014-515722 A | 7/2014 | |
| JP | 2015-069669 A | 4/2015 | |
| JP | 2016-108218 A | 6/2016 | |
| JP | 2017-530933 A | 10/2017 | |
| JP | 2018-513091 A | 5/2018 | |
| TW | 201623179 A | 7/2016 | |
| TW | 201731783 A | 9/2017 | |
| WO | 2010/002477 A1 | 1/2010 | |
| WO | 2012/121116 A1 | 9/2012 | |
| WO | 2016/057748 A1 | 4/2016 | |
| WO | 2016/154235 A1 | 9/2016 | |
| WO | 2017/030736 A1 | 2/2017 | |
| WO | 2017/104513 A1 | 6/2017 | |
| WO | 2017/223551 A1 | 12/2017 | |
| WO | 2019/022033 A1 | 1/2019 | |
| WO | 2019/191358 A1 | 10/2019 | |

OTHER PUBLICATIONS

Bubsey et al; "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

CeraGlide Boron Nitride coatings as provided by https://www.bn.saint-gobain.com/products/coatings DATAsheet (Year: 2019), 6 pages.

Chinese Patent Application No. 201980005720.8, Office Action, dated May 18, 2022, 18 pages (9 pages of English Translation and 9 pages of Original Document), Chinese Patent Office.

Eppler, "Glass formation and recrystallization in the lithium metasilicate region of the system $Li_2O$—$Al_2O_3$—$SiO_2$," Journal of the American Ceramic Society 46(2) 1963, pp. 97-101.

International Search Report and Written Opinion of the International Searching Authority; PCT/US2019/040906; Mailed Jan. 14, 2020; 17 Pages; European Patent Office.

Japanese Patent Application No. 2020-526427, Office Action dated Oct. 4, 2021, 19 pages (8 pages of English Translation and 9 pages of Original Document), Japanese Patent Office.

Reddy et al; "Fracture Toughness Measurement of Glass and Ceramic Materials Using Chevron-Notched Specimens," J. Am. Ceram. Soc., 71 [6], C-310-C-313 (1988).

Tang et al; "Automated Apparatus for Measuring the Frangibility and Fragmentation of Strengthened Glass"; Experimental Mechanics (2014) 54: 903-912.

ZYP Coatings, "Boron Nitride Lubricoat Boron Nitride Lubricoat-Blue" (Year: 2015), 2 Pages.

* cited by examiner

GLASS-CERAMIC ARTICLES WITH INCREASED RESISTANCE TO FRACTURE AND METHODS FOR MAKING THE SAME

CROSS-REFERENCE TO RELATED APPLICATIONS

This application is a continuation of U.S. application Ser. No. 16/512,953, filed on Jul. 16, 2019, which claims the benefit of priority under 35 U.S.C. § 119 of U.S. Provisional Application Ser. No. 62/698,532 filed on Jul. 16, 2018 and U.S. Provisional Application Ser. No. 62/736,682 filed on Sep. 26, 2018, the contents of each of which are relied upon and incorporated herein by reference in their entireties.

FIELD

The disclosure relates to glass-ceramic articles with increased resistance to fracture, and more particularly to ion-exchanged glass-ceramic articles with high fracture toughness and stored tensile energy and low haze, and ceramming schedules for making the same.

BACKGROUND

Glass-ceramic articles can be used as cover substrates and housings for mobile electronic devices. In some instances, glass-ceramic articles can have better mechanical properties than glass in terms of mechanical properties such as resistance to crack penetration and drop performance. Resistance to crack penetration and drop performance are important mechanical properties for cover substrates and housings for mobile electronic devices and there is a need to increase these mechanical properties in glass-ceramic articles.

When glass-ceramic articles are used as cover substrates, where transparency is important, it is desirable for the glass-ceramic to have suitable optical characteristics. The optical characteristics can be achieved through the heating treatments that convert a glass into a glass-ceramic. There is a need to improve the heating treatments to achieve desirable optical characteristics in glass-ceramic articles.

SUMMARY

In a first aspect, a glass-ceramic article comprises: a first surface; a second surface opposing the first surface; one or more crystalline phases; a residual glass phase; a compressive stress layer extending from the first surface to a depth of compression (DOC); a maximum central tension greater than 70 MPa; a stored tensile energy greater than 22 J/m$^2$; a fracture toughness greater than 1.0 MPa√m, wherein the fracture toughness is measured for a glass-ceramic having a composition and phase assemblage equivalent to the composition and phase assemblage at a center of the glass-ceramic article; and a haze less than 0.2.

In a second aspect, a glass-ceramic article comprises: a first surface; a second surface opposing the first surface; one or more crystalline phases; a residual glass phase; a compressive stress layer extending from the first surface to a depth of compression (DOC); a maximum central tension greater than 70 MPa; a stored tensile energy greater than 22 J/m$^2$; Young's modulus greater than 95 GPa, wherein the Young's modulus is measured for a glass-ceramic having a composition and phase assemblage equivalent to the composition and phase assemblage at a center of the glass-ceramic article; and a haze less than 0.2.

In a third aspect, a glass-ceramic article comprises: a first surface; a second surface opposing the first surface; one or more crystalline phases; a residual glass phase; a compressive stress layer extending from the first surface to a depth of compression (DOC); a maximum central tension greater than 70 MPa; a stored tensile energy greater than 22 J/m$^2$; $ZrO_2$ in a range from 1.7 mol % to 4.5 mol %; and a ratio of $LiO_2$ (mol %)/$R_2O$ (mol %) is greater than 0.85, wherein $R_2O$ is a sum of alkali metal oxides.

In a fourth aspect, a method of forming a glass-ceramic article, the method comprises: heating a glass composition to a nucleation temperature to create a nucleated crystallizable glass composition; heating the nucleated crystallizable glass composition to a crystallization temperature; and maintaining the crystallization temperature for a predetermined period of time to produce the glass-ceramic article, wherein the glass-ceramic article comprises: a fracture toughness greater than 1.0 MPa√m; and a haze less than 0.2.

In a fifth aspect, a method of forming a glass-ceramic article, the method comprises: heating a glass composition to a nucleation temperature ($T_N$); maintaining the nucleation temperature for a first predetermined period of time ($t_N$) to produce a nucleated crystallizable glass composition; heating the nucleated crystallizable glass composition to a crystallization temperature ($T_C$); and maintaining the crystallization temperature for a second predetermined period of time ($t_C$) to produce the glass-ceramic article, wherein $(103-0.260T_N+0.000203(T_N)^2-7.96t_N+0.1532(t_N)^2-0.019T_C-0.000008(T_C)^2-10.03t_C+0.00597T_N*t_N+0.00463t_N*T_C+0.01342T_C*t_C)<0.2$.

In a sixth aspect, a method for controlling the haze of a glass-ceramic article comprises: selecting a nucleation temperature ($T_N$), a first predetermined period of time ($t_N$), a crystallization temperature ($T_C$), and a second predetermined period of time ($t_C$) so that $(103-0.260T_N+0.000203(T_N)^2-7.96t_N+0.1532(t_N)^2-0.019T_C-0.000008(T_C)^2-10.03t_C+0.00597T_N*t_N+0.00463t_N*T_C+0.01342T_C*t_C)<0.2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4A is a plan view of an exemplary electronic device incorporating any of the glass-ceramic articles disclosed herein;

FIG. 4B is a perspective view of the exemplary electronic device of FIG. 4A;

DETAILED DESCRIPTION

Definitions and Measurement Techniques

Figure 1:
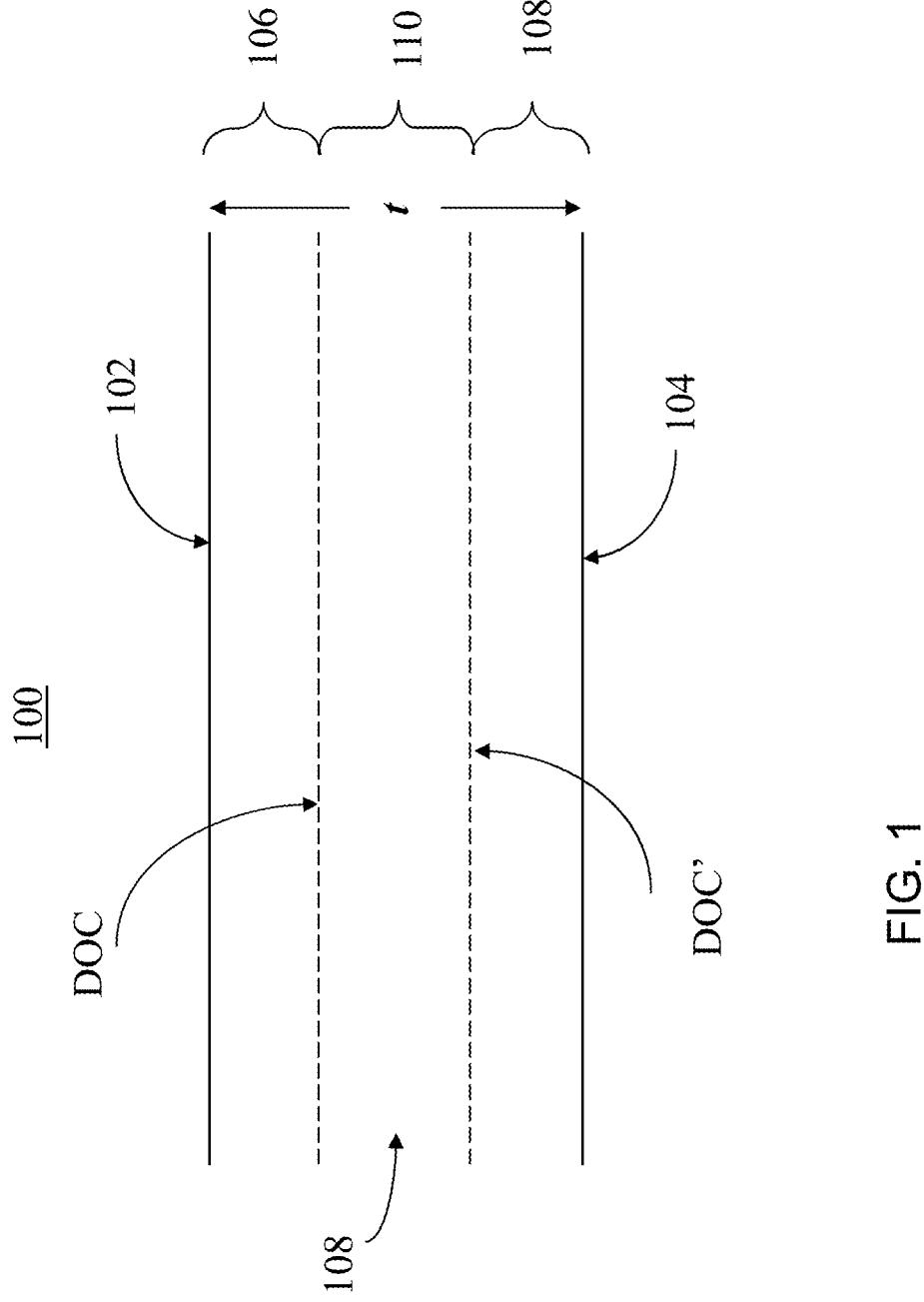
FIG. 1 is an exemplary cross-sectional view of a strengthened glass-ceramic article.

As used herein, the term "glass-ceramic" are solids prepared by controlled crystallization of a precursor glass and have one or more crystalline phases and a residual glass phase.

As used herein, "depth of compression" or "DOC" refers to the depth of a compressive stress (CS) layer and is the depth at which the stress within a glass-ceramic article changes from compressive stress to tensile stress and has a stress value of zero. According to the convention normally used in the art, compressive stress is expressed as a negative (<0) stress and tensile stress is expressed as a positive (>0) stress. Throughout this description, however, and unless otherwise noted, CS is expressed as a positive or absolute value—that is, as recited herein, CS=|CS|.

The DOC and maximum central tension (CT) values are measured using a scattered light polariscope (SCALP) model number SCALP-04 available from GlasStress Ltd., located in Tallinn, Estonia.

The surface CS measurement method depends on whether or not a vitreous region or layer is formed at the surface of the glass-ceramic article during ion exchange. If there is no vitreous layer or region, then the surface CS is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass-ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. If a vitreous region or layer is formed, then the surface CS (and the CS of the vitreous layer or region) is measured by the birefringence of the first transmission (coupling) resonance of the vitreous region in a prism coupling measurement and measures the depth of layer of the vitreous region by the spacing between the first and second transmission resonances or the breadth of the first transmission resonance.

The CS in the remainder of the CS region is measured by the refracted near-field (RNF) method described in U.S. Pat. No. 8,854,623, entitled "Systems and methods for measuring a profile characteristic of a glass sample", which is hereby incorporated by reference in its entirety. The RNF measurement is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The stress profile may be measured with a combination of RNF for the inner CS, SCALP for the CT region, and the method used for measuring the surface CS.

Stored tensile energy in ($J/m^2$) is calculated using the following Equation (1):

$$\text{stored tensile energy } (J/m^2) = [(1-v)/E] \int (\sigma^2)\,(dt) \tag{1}$$

where $v$ is Poisson's ratio, E is the Young's modulus, $\sigma$ is the stress, t is the thickness, and the integration is calculated across the thickness of the tensile region only.

The crystalline phase assemblage (before ion exchange) and weight percentage of the crystalline phases and residual glass phase is determined based on x-ray diffraction (XRD) using a Rietveld analysis.

The following procedure, referred to herein as "the Fragment Test", is used for determining the number of fragments the glass-ceramic article breaks into upon fracture. An ion-exchanged glass-ceramic article have dimensions of 50 mm by 50 mm by 0.8 mm is placed on a steel surface such as a MVN precision vertical stage available from Newport Corporation. A stylus with a tungsten carbide tip (available from Fisher Scientific Industries, under the trademark TOSCO® and manufacturer identifying number #13-378, with a 60 degree coni-spherical tip), having a weight of 40 g is connected to a clamp on a gear driven mechanism that moves the stylus up and down. The tip of the stylus is placed in contact with the glass-ceramic article and then the gear mechanism is incrementally turned until the glass-ceramic article breaks. Then the number of fragments is counted.

The fracture toughness value ($K_{1C}$) was measured by chevron notched short bar (CNSB) method disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). The ($K_{1C}$) is measured on a non-ion exchanged glass-ceramic article. For an ion-exchanged glass-ceramic article, the $K_{1C}$ can be measured on a non-ion-exchanged glass-ceramic article having a composition and crystalline phase assemblage equivalent to that at the center (half thickness) of the ion-exchanged glass-ceramic article. The composition of the center of an ion-exchanged glass-ceramic article can be determined by microprobe by performing a line scan from surface to surface and determining the composition at the center and then determining the crystalline phase assemblage at the center from xray diffraction.

The Young's modulus values recited in this disclosure refer to a value as measured by a resonant ultrasonic spectroscopy technique of the general type set forth in ASTM E2001-13. The Young's modulus is measured on a non-ion exchanged glass-ceramic article. For an ion-exchanged glass-ceramic article, the Young's modulus can be measured on a non-ion-exchanged glass-ceramic article having a composition and crystalline phase assemblage equivalent to that at the center (half thickness) of the ion-exchanged glass-ceramic article. The composition of the center of an ion-exchanged glass-ceramic article can be determined by microprobe by performing a line scan from surface to surface and determining the composition at the center and then determining the crystalline phase assemblage at the center from xray diffraction.

Haze of a glass-ceramic article is measured using a haze meter, such as the BYK Gardner Haze-Gard i.

The transmittance, as utilized herein refers to total transmittance, and is measured with a Perkin Elmer Lambda 950 UV/VIS/NIR spectrophotometer with a 150 mm integrating sphere. The samples were mounted at the sphere's entrance port, allowing for collection of wide angle scattered light. The total transmittance data was collected with the reference Spectralon reflectance disc over the sphere's exit port. The percent of total transmittance (% T) was calculated relative to an open beam baseline measurement.

General Overview of Properties of Glass-Ceramic Articles

Reference will now be made in detail to the present preferred embodiment(s), examples of which is/are illustrated in the accompanying drawings. Whenever possible, the same reference numerals will be used throughout the drawings to refer to the same or like parts.

Glass-ceramic articles have attributes that can be tailored for use as cover substrates and/or housings for mobile electronic devices. For example, without being bound by theory, glass-ceramic articles with high fracture toughness and/or Young's modulus can provide resistance to crack penetration and drop performance. When such glass-ceramic articles are chemically strengthened, for example through ion exchange, the resistance to crack penetration and drop performance can be further enhanced. And the high fracture toughness and/or Young's modulus can also increase the amount of stored tensile energy and maximum central tension that can be imparted to the glass-ceramic article through chemical tempering while maintaining desirable fragmentation of the glass-ceramic article upon fracture. As another example, the optical characteristics of the glass-ceramic articles, such as transparency and haze, can be tailored through adjusting the heating/ceramming schedule used to turn a glass article into a glass-ceramic article as well as through chemical strengthening, such as through ion exchange, to design or control the properties of the glass-ceramic article.

FIG. 1 depicts an exemplary cross-sectional side view of a strengthened glass-ceramic article 100 having a first surface 102 and an opposing second surface 104 separated by a thickness (t). In some embodiments, strengthened glass-ceramic article 100 has been ion exchanged and has a compressive stress (CS) layer 106 (or first region) extending from first surface 102 to a depth of compression (DOC). In some embodiments, as shown in FIG. 1, the glass-ceramic article 100 also has a compressive stress (CS) layer 108 extending from second surface 104 to a depth of compression DOC'. There is also a central tension region 110 under tensile stress in between DOC and DOC'. In some embodiments, DOC and DOC' may be in a range from greater than 0*t to 0.3*t, 0*t to 0.25*t, 0*t to 0.2*t, 0*t to 0.15*t, 0*t to 0.1*t. 0*t to 0.05*t. 0.05*t to 0.3*t, 0.05*t to 0.25*t, 0.05*t to 0.2*t, 0.05*t to 0.15*t, 0.05*t to 0.1*t, 0.1*t to 0.3*t, 0.1*t to 0.25*t, 0.1*t to 0.2*t, 0.1*t to 0.15*t, and all ranges and subranges therebetween wherein t is the thickness of the glass ceramic article 100. For example, the depth of a compressive stress layer (DOC, DOC') can be greater than 0.05*t, 0.06*t, 0.07*t, 0.08*t, 0.09*t, 0.1*t, 0.11*t, 0.12*t, 0.13*t, 0.14*t, 0.15*t, 0.16*t, 0.17*t, 0.18*t, 0.19*t, 0.2*t, 0.21*t, 0.22*t, 0.23*t, 0.24*t, 0.25*t, 0.26*t, 0.27*t, 0.28*t, 0.29*t, or 0.3*t. In other embodiments, the depth of a compressive stress layer (DOC, DOC') is in a range from 0.05 mm to 0.6 mm, 0.05 mm to 0.5 mm, 0.05 mm to 0.4 mm, 0.05 mm to 0.3 mm, 0.05 mm to 0.2 mm, 0.05 mm to 0.1 mm, 0.1 mm to 0.6 mm, 0.1 mm to 0.5 mm, 0.1 mm to 0.4 mm, 0.1 mm to 0.3 mm, 0.2 mm to 0.6 mm, 0.2 mm to 0.5 mm, 0.2 mm to 0.4 mm, and all ranges and subranges therebetween. In some embodiments the depth of the compressive stress layer is greater than or equal to 0.05 mm, 0.06 mm, 0.07 mm, 0.08 mm. 0.09 mm, 0.1 mm. 0.15 mm, 0.2 mm, 0.25 mm, 0.3 mm, 0.35 mm, 0.4 mm. 0.45 mm, 0.5 mm, 0.55 mm or 0.6 mm. In some embodiments DOC may be the same as DOC'. In other embodiments, DOC may be different than DOC'.

In some embodiments, the maximum central tension (CT) is in a range from greater than 70 MPa to 180 MPa. In some embodiments, the maximum CT is greater than or equal to 70 MPa, 80 MPa, 90 MPa, 100 MPa, 110 MPa, 120 MPa, 130 MPa, 140 MPa, 150 MPa, 160 MPa, or 170 MPa. In some embodiments, the maximum CT can be in a range from greater than 70 MPa to 180 MPa, greater than 70 MPa to 170 MPa, greater than 70 MPa to 160 MPa, greater than 70 MPa to 150 MPa, greater than 70 MPa to 140 MPa, greater than 80 MPa to 180 MPa, greater than 80 MPa to 170 MPa, greater than 80 MPa to 160 MPa, greater than 80 MPa to 150 MPa, greater than 80 MPa to 140 MPa, greater than 90 MPa to 180 MPa, greater than 90 MPa to 170 MPa, greater than 90 MPa to 160 MPa, greater than 90 MPa to 150 MPa, greater than 90 MPa to 140 MPa, 100 MPa to 180 MPa, 100 MPa to 170 MPa, 100 MPa to 160 MPa, 100 MPa to 150 MPa, 100 MPa to 140 MPa, 110 MPa to 180 MPa, 110 MPa to 170 MPa, 110 MPa to 160 MPa, 110 MPa to 150 MPa, 110 MPa to 140 MPa, 120 MPa to 180 MPa, 120 MPa to 170 MPa, 120 MPa to 160 MPa, 120 MPa to 150 MPa, 120 MPa to 140 MPa, 130 MPa to 180 MPa, 130 MPa to 170 MPa, 130 MPa to 1500 MPa or any range and subranges therebetween.

In some embodiments, the stored tensile energy of the glass-ceramic article is in a range from greater than 22 J/m² to 100 J/m², greater than 22 J/m² to 90 J/m², greater than 22 J/m² to 80 J/m² greater than 22 J/m² to 70 J/m², greater than 22 J/m² to 65 J/m², greater than 22 J/m² to 60 J/m² greater than 22 J/m² to 55 J/m² greater than 22 J/m² to 50 J/m², greater than 22 J/m² to 45 J/m², greater than 22 J/m² to 40 J/m², greater than 22 J/m² to 35 J/m², greater than 22 J/m² to 30 J/m², 25 J/m² to 100 J/m², 25 J/m² to 90 J/m², 25 J/m² to 80 J/m², 25 J/m² to 70 J/m², 25 J/m² to 65 J/m², 25 J/m² to 60 J/m², 25 J/m² to 55 J/m², 25 J/m² to 50 J/m², 25 J/m² to 45 J/m², 25 J/m² to 40 J/m², 25 J/m² to 35 J/m², 25 J/m² to 30 J/m², 30 J/m² to 100 J/m², 30 J/m² to 90 J/m², 30 J/m² to 80 J/m², 30 J/m² to 70 J/m², 30 J/m² to 65 J/m², 30 J/m² to 60 J/m², 30 J/m² to 55 J/m², 30 J/m² to 50 J/m², 30 J/m² to 45 J/m², 30 J/m² to 40 J/m², 30 J/m² to 35 J/m², 35 J/m² to 60 J/m², 35 J/m² to 100 J/m², 35 J/m² to 90 J/m², 35 J/m² to 80 J/m², 35 J/m² to 70 J/m², 35 J/m² to 65 J/m², 35 J/m² to 60 J/m², 35 J/m² to 55 J/m², 35 J/m² to 50 J/m², 35 J/m² to 45 J/m², 35 J/m² to 40 J/m², 40 J/m² to 100 J/m², 40 J/m² to 90 J/m², 40 J/m² to 80 J/m², 40 J/m² to 70 J/m², 40 J/m² to 65 J/m², 40 J/m² to 60 J/m², 40 J/m² to 55 J/m², 40 J/m² to 50 J/m², 40 J/m² to 45 J/m², 45 J/m² to 100 J/m², 45 J/m² to 90 J/m², 45 J/m² to 80 J/m², 45 J/m² to 70 J/m², 45 J/m² to 65 J/m², 45 J/m² to 60 J/m², 45 J/m² to 55 J/m², 45 J/m² to 50 J/m², 65 J/m² to 100 J/m², 65 J/m² to 90 J/m², 65 J/m² to 80 J/m², 65 J/m² to 70 J/m², and all ranges and subranges therebetween. In some embodiments, the stored tensile energy can be greater than or equal to 22 J/m², 23 J/m², 24 J/m², 25 J/m², 30 J/m², 35 J/m², 40 J/m², 45 J/m², 50 J/m², 55 J/m², 60 J/m², 65 J/m², 70 J/m², 75 J/m², 80 J/m², 85 J/m², 90 J/m², or 95 J/m². In some embodiments, for example when less than 5 fragments are desired under the Fragment Test, the stored tensile energy of the glass-ceramic article is in a range from greater than 22 J/m² to 65 J/m².

In some embodiments, the glass-ceramic article has a thickness t in a range from 0.2 mm to 4 mm, 0.2 mm to 3 mm, 0.2 mm to 2 mm, 0.2 mm to 1.5 mm, 0.2 mm to 1 mm, 0.2 mm to 0.9 mm, 0.2 mm to 0.8 mm, 0.2 mm to 0.7 mm, 0.2 mm to 0.6 mm, 0.2 mm to 0.5 mm, 0.3 mm to 4 mm, 0.3 mm to 3 mm, 0.3 mm to 2 mm, 0.3 mm to 1.5 mm, 0.3 mm to 1 mm, 0.3 mm to 0.9 mm, 0.3 mm to 0.8 mm, 0.3 mm to 0.7 mm, 0.3 mm to 0.6 mm, 0.3 mm to 0.5 mm, 0.4 mm to 4 mm, 0.4 mm to 3 mm, 0.4 mm to 2 mm, 0.4 mm to 1.5 mm, 0.4 mm to 1 mm, 0.4 mm to 0.9 mm, 0.4 mm to 0.8 mm, 0.4 mm to 0.7 mm, 0.4 mm to 0.6 mm, 0.5 mm to 4 mm, 0.5 mm to 3 mm, 0.5 mm to 2 mm, 0.5 mm to 1.5 mm, 0.5 mm to 1 mm, 0.5 mm to 0.9 mm, 0.5 mm to 0.8 mm, 0.5 mm to 0.7 mm, 0.8 mm to 4 mm, 0.8 mm to 3 mm, 0.8 mm to 2 mm, 0.8 mm to 1.5 mm, 0.8 mm to 1 mm, 1 mm to 2 mm, 1 mm to 1.5 mm, and all ranges and subranges therebetween. In some embodiments, the glass-ceramic article may be substantially planar and flat. In other embodiments, the glass-ceramic article may be shaped, for example it may have a 2.5D or 3D shape. In some embodiments, the glass-ceramic article may have a uniform thickness and in other embodiments, the glass-ceramic article may not have a uniform thickness.

In some embodiments, the fracture toughness of the glass-ceramic article is in a range from 1.0 MPa√m to 2.0 MPa√m, 1.1 MPa√m to 2.0 MPa√m, 1.2 MPa√m to 2.0 MPa√m, 1.3 MPa√m to 2.0 MPa√m, 1.4 MPa√m to 2.0 MPa√m, 1.5 MPa√m to 2.0 MPa√m, 1.0 MPa√m to 1.9 MPa√m, 1.1 MPa√m to 1.9 MPa√m, 1.2 MPa√m to 1.9 MPa√m, 1.3 MPa√m to 1.9 MPa√m, 1.4 MPa√m to 1.9 MPa√m, 1.5 MPa√m to 1.9 MPa√m, 1.0 MPa√m to 1.8 MPa√m, 1.1 MPa√m to 1.8 MPa√m, 1.2 MPa√m to 1.8 MPa√m, 1.3 MPa√m to 1.8 MPa√m, 1.4 MPa√m to 1.8 MPa√m, 1.5 MPa√m to 1.8 MPa√m, and all ranges and subranges therebetween. In some embodiments, the fracture toughness of the glass-ceramic article is greater than or equal to 1.0 MPa√m, 1.1 MPa√m, 1.2 MPa√m, 1.3 MPa√m, 1.4 MPa√m, 1.5 MPa√m, 1.6 MPa√m, 1.7 MPa√m, 1.8 MPa√m, or 1.9 MPa√m. Without being bound by theory, glass-ceramic articles with fracture toughness in this range permit an increase in the stored tensile energy that results in less than 5 fragments under the Fragment Test.

In some embodiments, the Young's modulus of the glass-ceramic article is in a range from 95 GPa to 110 GPa, 95 GPa to 105 GPa, 95 GPa to 100 GPa, 100 GPa to 110 GPa, 100 GPa to 105 GPa, 105 GPa to 110 GPa and all ranges and subranges therebetween. In some embodiments, the Young's modulus of the glass-ceramic article is greater than or equal to 95 GPa, 96 GPa, 97 GPa, 98 GPa, 99 GPa, 100 GPa, 101 GPa, 102 GPa, 103 GPa, 104 GPa, 105 GPa, 106 GPa, 107 GPa, 108 GPa, or 109 GPa. Without being bound by theory, glass-ceramic articles with fracture toughness in this range permit an increase in the stored tensile energy that results in less than 5 fragments under the Fragment Test.

In some embodiments, upon application of the Fragment Test (based on a 50 mm by 50 mm by 0.8 mm sample)

described above, the glass-ceramic article breaks into less than 5 fragments, less than 4 fragments, or less than 3 fragments.

Compositions

The precursor glasses and glass-ceramics described herein may be generically described as lithium-containing aluminosilicate glasses or glass-ceramics and comprise $SiO_2$, $Al_2O_3$, and $Li_2O$. In addition to $SiO_2$, $Al_2O_3$, and $Li_2O$, the glasses and glass-ceramics embodied herein may further contain alkali salts, such as $Na_2O$, $K_2O$, $Rb_2O$, or $Cs_2O$, as well as $P_2O_5$, and $ZrO_2$ and a number of other components as described below. In some embodiments, the precursor glass (before ceramming) and/or the glass-ceramic (after ceramming) may have the following composition in mole percentage on an oxide basis:

$SiO_2$: 60-72%;
$Al_2O_3$: 0-6%;
$Li_2O$: 20-32%;
$B_2O_3$: 0-2%;
$Na_2O$: 0-2%;
$K_2O$: 0-2%;
$P_2O_5$: 0.7-2.2%; and
$ZrO_2$: 1.7-4.5%.

In some embodiments, precursor glass and/or the glass-ceramic may have the following optional additional components in mole percentage on an oxide basis:

$SnO_2$: 0.05-0.5%;
$Fe_2O_3$: 0-0.5%;
$MgO$: 0-1%;
$ZnO$: 0-1%;
$BaO$: 0-1%;
$SrO$: 0-1%;
$La_2O_3$: 0-1%;
$GeO_2$: 0-1%;
$Ta_2O_5$: 0-1%.

Exemplary precursor glass and glass-ceramic compositions in mol % on a metal oxide basis, are listed in Table 1 below.

TABLE 1

| Composition | 1 | 2 | 3 | 4 | 5 | 6 | 7 |
|---|---|---|---|---|---|---|---|
| $SiO_2$ (mol %) | 70.52 | 62 | 70.7 | 69.3 | 69.8 | 70.5 | 70.3 |
| $Al_2O_3$ (mol %) | 4.27 | 0 | 4.3 | 4.2 | 4.3 | 4.3 | 4.3 |
| $B_2O_3$ (mol %) | 0 | 0 | 0 | 1.5 | 0 | 0 | 0 |
| $Li_2O$ (mol %) | 22.07 | 31 | 22.1 | 22.1 | 22 | 22 | 22 |
| $Na_2O$ (mol %) | 0.05 | 1.5 | 0 | 0.1 | 0 | 0.2 | 0.5 |
| $K_2O$ (mol %) | 0.09 | 0 | 0 | 0 | 0 | 0 | 0 |
| $P_2O_5$ (mol %) | 0.85 | 2 | 0.9 | 0.8 | 0.9 | 0.9 | 0.9 |
| $ZrO_2$ (mol %) | 1.97 | 3 | 2 | 1.9 | 3 | 2 | 2 |
| $SnO_2$ (mol %) | 0.15 | 0 | 0 | 0 | 0 | 0 | 0 |
| $Fe_2O_3$ (mol %) | 0.02 | 0 | 0 | 0 | 0 | 0 | 0 |
| $Li_2O/R_2O$ | 0.99 | 0.95 | 1.00 | 1.00 | 1.00 | 0.99 | 0.98 |

| Composition | 8 | 9 | 10 | 11 | 12 | 13 |
|---|---|---|---|---|---|---|
| $SiO_2$ (mol %) | 70 | 71.2 | 70.9 | 70.3 | 70.2 | 70.30 |
| $Al_2O_3$ (mol %) | 4.3 | 4.6 | 4.9 | 3.8 | 4.3 | 4.23 |
| $B_2O_3$ (mol %) | 0 | 0 | 0 | 0 | 0 | 0 |
| $Li_2O$ (mol %) | 21.9 | 21.2 | 21.3 | 22 | 21.9 | 21.36 |
| $Na_2O$ (mol %) | 1 | 0 | 0 | 0 | 0 | 1.51 |
| $K_2O$ (mol %) | 0 | 0 | 0 | 0 | 0 | 0 |
| $P_2O_5$ (mol %) | 0.9 | 0.9 | 0.9 | 0.9 | 0.9 | 0.87 |
| $ZrO_2$ (mol %) | 2 | 2 | 2 | 3 | 2.7 | 1.66 |
| $SnO_2$ (mol %) | 0 | 0 | 0 | 0 | 0 | 0 |
| $Fe_2O_3$ (mol %) | 0 | 0 | 0 | 0 | 0 | 0 |
| $Li_2O/R_2O$ | 0.96 | 1.00 | 1.00 | 1.00 | 1.00 | 0.93 |

$SiO_2$, an oxide involved in the formation of glass, can function to stabilize the networking structure of glasses and glass-ceramics. In some embodiments, the glass or glass-ceramic composition comprises from about 60 to about 72 mol % $SiO_2$. In some embodiments, the glass or glass-ceramic composition can comprise from about 60 to about 72 mol %, about 60 to about 70 mol %, about 60 to about 67 mol %, about 60 to about 65 mol %, 65 to about 72 mol %, about 65 to about 70 mol %, about 65 to about 67 mol %, and all ranges and subranges therebetween $SiO_2$. In some embodiments, the glass or glass-ceramic composition comprises about 60, 61, 62, 63, 64, 65, 66, 67, 68, 69, 70, 71, or 72 mol % $SiO_2$.

With respect to viscosity and mechanical performance, the viscosity and mechanical performance are influenced by glass compositions. In the glasses and glass-ceramics, $SiO_2$ serves as the primary glass-forming oxide for the precursor glass and can function to stabilize the networking structure of glass and glass-ceramic. The amount of $SiO_2$ may be limited to control melting temperature (200 poise temperature), as the melting temperature of pure $SiO_2$ or high-$SiO_2$ glasses is undesirably high.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass-ceramic composition can comprise from about 0 to about 6 mol % $Al_2O_3$ and all ranges and subranges therebetween. In some embodiments, the glass or glass-ceramic composition can comprise about 1, 2, 3, 4, 5, or 6 mol % $Al_2O_3$.

In the glass and glass-ceramics herein, $Li_2O$ aids in forming crystal phases. In some embodied compositions, the glass or glass-ceramic can comprise from about 20 mol % to about 32 mol % $Li_2O$. In some embodiments, the glass or glass-ceramic composition can comprise from about 20 to about 32 mol %, about 20 to about 30 mol %, about 20 to about 27 mol %, about 20 to about 25 mol %, about 25 to about 32 mol %, about 25 to about 30 mol %, and all ranges and subranges therebetween $Li_2O$. In some embodiments, the glass or glass-ceramic composition can comprise about 20, 21, 22, 23, 24, 25, 26, 27, 28, 29, 30, 31, or 32 mol % $Li_2O$.

As noted above, $Li_2O$ is generally useful for forming the embodied glass-ceramics, but the other alkali oxides tend to decrease glass-ceramic formation and form an aluminosilicate residual glass in the glass-ceramic. It has been found that more if the amount of other alkali metal oxides, such as $Na_2O$, $K_2O$, $Rb_2O$, $Cs_2O$, is too high there can be an undesirable amount of residual glass which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the compositions described herein have low amounts of non-lithium alkali oxides. In some embodiments, the glass or glass-ceramic composition can comprise a ratio of $Li_2O$ (mol %)/$R_2O$ (mol %) greater than about 0.85 to 1.0, from greater than 0.85 to 0.97, from greater than 0.85 to 0.95, from 0.86 to 1.0, from 0.86 to 0.97, from 0.86 to 0.95, from 0.87 to 1.0, from 0.87 to 0.97, from 0.87 to 0.95, from 0.88 to 1.0, from 0.88 to 0.97, from 0.88 to 0.95, from 0.89 to 1.0, from 0.89 to 0.97, from 0.89 to 0.95, from 0.9 to 1.0, from 0.9 to 0.97, from 0.9 to 0.95, from 0.91 to 1.0, from 0.91 to 0.97, from 0.91 to 0.95, from 0.92 to 1.0, from 0.92 to 0.97, from 0.93 to 1.0, from 0.93 to 0.97, from 0.94 to 1.0, from 0.95 to 1.0, from 0.96 to 1.0, from 0.97 to 1.0 and all ranges and subranges therebetween. $R_2O$ is the sum of all alkali metal oxides including $Li_2O$, $Na_2O$, $K_2O$, $Rb_2O$, and $Cs_2O$. In some embodiments the glass or glass-ceramic composition can comprise a ratio of $Li_2O$ (mol %)/$R_2O$ (mol %) greater than or equal to about 0.85, 0.86, 0.87, 0.88, 0.89, 0.9, 0.91, 0.92, 0.93, 0.94, 0.95, 0.96, 0.97, 0.98, or 0.99.

The glass and glass-ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodied compositions can comprise from 0.7 to about 2.2 mol %, 0.7 to about 2 mol %, 0.7 to about 1.5 mol %, 0.7 to about 1 mol %, about 1 to about 2.2 mol %, about 1 to about 2 mol %, about 1.5 to about 2.2 mol %, and all ranges and subranges therebetween $P_2O_5$. In some embodiments, the glass or glass-ceramic composition can comprise about 0.7, 0.8, 0.9, 1.0, 1.1, 1.2, 1.3, 1.4, 1.5, 1.6, 1.7, 1.8, 1.9, 2.0, 2.1, or 2.2 mol % $P_2O_5$.

In the glass and glass-ceramics herein, it is generally found that $ZrO_2$ can improve the stability of $Li_2O$—$Al_2O_3$—$SiO_2$—$P_2O_5$ glass by significantly reducing glass devitrification during forming and lowering liquidus temperature. Without being bound by theory increasing the amount of $ZrO_2$ increases the amount of alkali metal oxides in the residual glass. The addition of $ZrO_2$ can also help decrease the grain size of the crystals, which aids in the formation of a transparent glass-ceramic. In some embodiments, the glass or glass-ceramic composition can comprise from about 1.7 to about 4.5 mol %, about 1.7 to about 4 mol %, about 1.7 to about 3.5 mol %, about 1.7 to about 3 mol %, about 1.7 to 2.5 mol %, about 2 to about 4.5 mol %, 2 to about 4 mol %, about 2 to about 3.5 mol %, about 2 to about 3 mol %, about 2.5 to about 4.5 mol %, about 2.5 to 4 mol %, about 2.5 to about 3.5 mol %, and all ranges and subranges therebetween $ZrO_2$. In some embodiments, the glass or glass-ceramic composition can comprise about 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 mol % $ZrO_2$.

$B_2O_3$ is conducive to providing a precursor glass with a low melting temperature. Furthermore, the addition of $B_2O_3$ in the precursor glass and thus the glass-ceramics helps achieve an interlocking crystal microstructure and can also improve the damage resistance of the glass-ceramic. When boron in the residual glass is not charge balanced by alkali oxides or divalent cation oxides, it will be in trigonal-coordination state (or three-coordinated boron), which opens up the structure of the glass. The network around these three-coordinated boron is not as rigid as tetrahedrally coordinated (or four-coordinated) boron. Without being bound by theory, it is believed that precursor glasses and glass-ceramics that include three-coordinated boron can tolerate some degree of deformation before crack formation. By tolerating some deformation, the Vickers indentation crack initiation values are increased. Fracture toughness of the precursor glasses and glass-ceramics that include three-coordinated boron may also be increased. Without being bound by theory, it is believed that the presence of boron in the residual glass of the glass-ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack initiation load. In some embodiments, the amount of three-coordinated boron (as a percent of total $B_2O_3$) may be about 40% or greater, 50% or greater, 75% or greater, about 85% or greater or even about 95% or greater. The amount of boron in general should be controlled to maintain chemical durability and mechanical strength of the cerammed bulk glass-ceramic.

In one or more embodiments, the glasses and glass-ceramic herein can comprise from 0 to about 2 mol % and all ranges and subranges therebetween. In some embodiments, the glass or glass-ceramic composition can comprise about 0, >0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2 mol % $B_2O_3$.

In one or more embodiments, the glasses and glass-ceramics herein can comprise from 0 to about 0.5 mol % $SnO_2$ and as used as a fining agent. In some embodiments, the glass or glass-ceramic composition can comprise from 0 to about 0.5 mol %, 0 to about 0.4 mol %, 0 to about 0.3 mol %, 0 to about 0.2 mol %, 0 to about 0.1 mol %, about 0.05 to about 0.5 mol %, 0.05 to about 0.4 mol %, 0.05 to about 0.3 mol %, 0.05 to about 0.2 mol %, 0.05 to about 0.1 mol %, about 0.1 to about 0.5 mol %, about 0.1 to about 0.4 mol %, about 0.1 to about 0.3 mol %, about 0.1 to about 0.2 mol %, about 0.2 to about 0.5 mol %, about 0.2 to about 0.4 mol %, about 0.2 to about 0.3 mol %, about 0.3 to about 0.5 mol %, about 0.3 to about 0.4 mol %, about 0.4 to about 0.5 mol %, and all ranges and subranges therebetween $SnO_2$. In some embodiments, the glass or glass-ceramic composition can comprise about 0, >0, 0.05, 0.1, 0.2, 0.3, 0.4, or 0.5 mol % $SnO_2$.

When the amount of transmission metal oxides, including but not limited to, iron oxide (for example $Fe_2O_3$), copper oxide (for example $Cu_2O_3$), chromium oxide (for example $Cr_2O_3$) and/or molybdenum oxide (for example $MoO_2$) are too high they can affect the color of the glass-ceramic and thereby affect the transparency of the glass-ceramic. In some embodiments, the glass and/or glass-ceramic composition can comprise less than 0.5 mol %, 0.4 mol %, 0.3 mol %, 0.2 mol %, 0.1 mol %, or 0.05 mol % $Fe_2O_3$ $Cu_2O_3$, $Cr_2O_3$, and/or $MoO_2$ individually or as a sum total.

Heat Treatments for Crystallization/Ceramming

In one or more embodiments, the processes for making glass-ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment may include (i) heating precursor glasses at a rate of 0.01-50° C./min to a nucleation temperature (Tn); (ii) maintaining the crystallizable glasses at the nucleation temperature for first predetermined period of time ($t_N$) to produce a nucleated crystallizable glass compositions; (iii) heating the nucleated crystallizable glasses at a rate in the range from about 0.01° C./min to about 50° C./min to a crystallization temperature (Tc); (iv) maintaining the nucleated crystallizable glasses at the crystallization temperature for a second predetermined period of time ($t_C$) to produce the glass-ceramic articles described herein; and (v) cooling the formed glass-ceramic to room temperature. The terms "ceram" or "ceramming", in the preceding embodiments, may be used to refer to steps (iii), (iv) and optionally (v), collectively. In some embodiments, the nucleation temperature can be in a range from 500° C. to 650° C. (for example, 500° C., 510° C., 520° C., 530° C., 540° C., 550° C., 560° C., 570° C., 580° C., 590° C., 600° C., 610° C., 620° C., 630° C., 640° C., or 650° C.) and all ranges and subranges therebetween; and/or the crystallization temperature can be in a range from 680° C. to 800° C. (for example, 680° C., 690° C., 700° C., 710° C., 720° C., 730° C., 740° C., 750° C., 760° C., 770° C., 780° C., 790° C., or 800° C.) and all ranges and subranges therebetween. In some embodiments, the first predetermined time for maintaining the nucleation temperature can be in a range from 1 minute to 6 hours (for example 1 minute, 5 minutes, 10 minutes, 20 minutes, 30 minutes, 40 minutes, 50 minutes, 1 hour, 1.5 hours, 2 hours, 2.5 hours, 3 hours, 3.5 hours, 4 hours, 4.5 hours, 5 hours, 5.5 hours, or 6 hours) and all ranges and subranges therebetween. In some embodiments, the second predetermined time for maintaining the crystallization temperature can be in a range from 1 minute to 4 hours (for example 1 minute, 5 minutes, 10 minutes, 20 minutes, 30 minutes, 40 minutes, 50 minutes, 1 hour, 1.5 hours, 2 hours, 2.5 hours, 3 hours, 3.5 hours, or 4 hours) and all ranges and subranges therebetween. In some embodiments, the crystallization temperature depends on whether a transparent or translucent/opaque glass-ceramic is desired. In some embodiments, a crystallization temperature of about 750° C. or below will result in a transparent glass-ceramic and a crystallization temperature above about 750° C. will result in a translucent/opaque glass-ceramic. In some embodiments, the glass can be heated from room temperature to a nucleation temperature of 570° C. at a rate of 5° C./min, maintained at the nucleation temperature for 4 hours, then heated to the crystallization temperature of 740° C. at a rate of 5° C./min, and maintained at the crystallization temperature for 1 hour.

In some embodiments, there may be one of more additional temperature holds between the nucleation temperature and the crystallization temperature. Without being bound by theory, the additional temperature holds decreases the residual stress (as measured by optical retardance) and the warp/deformation induced by the ceramming process. Thus, in some embodiments, after maintaining the article at the nucleation temperature, the article may be heated to one or more intermediate temperatures (wherein the intermediate temperatures are in a range between the nucleation temperature and the crystallization temperature) and held at the one or more intermediate temperatures for a predetermined time (for example, between 10 minutes and 4 hours and all ranges and subranges therebetween) and then heated to the crystallization temperature. Example 5 below demonstrates exemplary 3-step heat treatment cycles with an intermediate temperature hold.

In some embodiments, once the composition is heated to the nucleation temperature, the composition is not maintained at the nucleation temperature but instead is continuously heated to one or more intermediate temperatures until the crystallization temperature is reached (i.e., the temperature is not maintained at any of the intermediate temperatures or the nucleation temperature). In some embodiments, the heating rate from room temperature to the nucleation temperature, the heating rate from the nucleation temperature to the intermediate temperature, the heating rate from the intermediate temperature to the crystallization temperature vary. In embodiments where there are multiple intermediate temperatures, the heating rate between the individual intermediate temperatures may also vary. Example 6 below demonstrates such exemplary heat treatment schedules. In some embodiments, the heating rates may vary and may be in a range from about 0.01° C./min to about 50° C./min, about 0.01° C./min, about 0.1° C./min, about 0.5° C./min, about 1° C./min, about 2° C./min, about 3° C./min, about 4° C./min, about 5° C./min, about 10° C./min, about 15° C./min, about 20° C./min, about 25° C./min, about 30° C./min, about 40° C./min, about 45° C./min, about 50° C./min, and all ranges and subranges therebetween. In some embodiments, the heating rate may increase from one heating rate to another heating rate. In other embodiments, the heating rate may decrease from one heating rate to another heating rate.

In some embodiments, the glass-ceramic article is cooled after being held at the crystallization temperature. In some embodiments, the glass-ceramic article may be cool to room temperature in a single stage at a constant cooling rate, in two stages each with a different cooling rate, or in three or more stages each with a different cooling rate. In some embodiments, the glass-ceramic articles are cooled at a controlled rate from the crystallization temperature in order to minimize temperature gradients across the articles as well as minimize residual stress across the articles. Temperature gradients and differences in residual stress may lead to the articles warping during cooling. Thus, controlling the cooling to control the temperature gradients and residuals stresses may also minimize warpage of the glass-ceramic articles.

Figure 2:
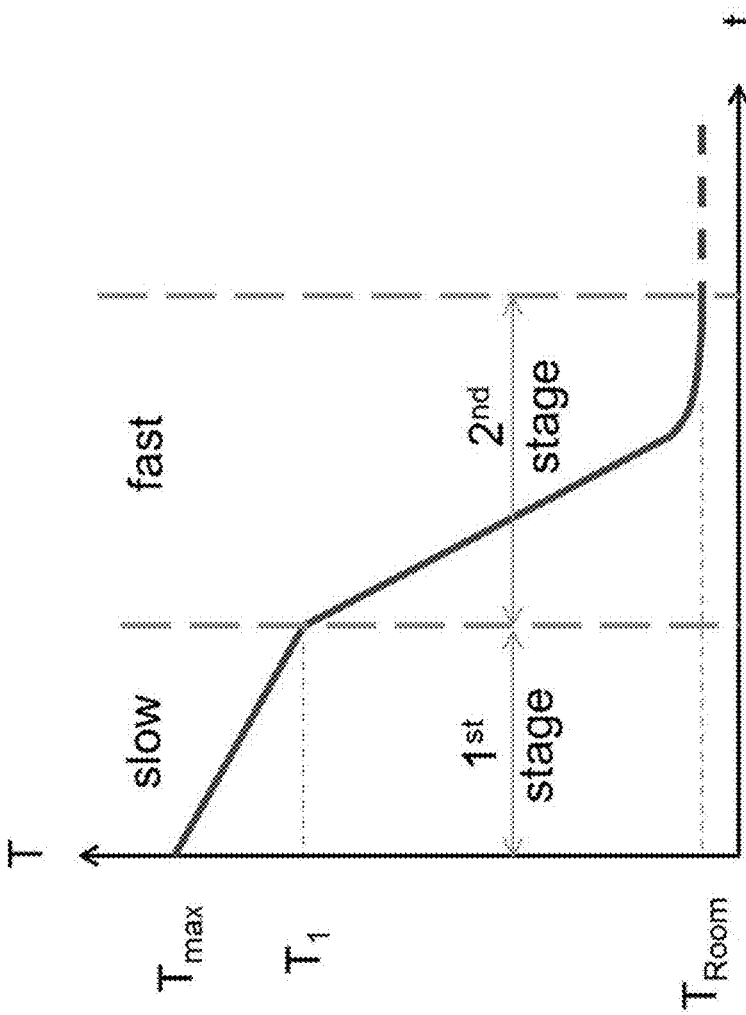
FIG. 2 is an exemplary diagram of a cooling cycle.

In some embodiments, as shown for example in FIG. 2, cooling may occur in two cooling stages. In such embodiments, in the first cooling stage, the temperature cools from $T_{max}$ (i.e., $T_C$–the crystallization temperature) to $T_1$ at a first cooling rate. In the second cooling stage, the temperature cools from $T_1$ to about room temperature ($T_{Room}$) at a second cooling rate. As shown in FIG. 2, the first cooling rate is slower than the second cooling rate. The first cooling rate during the first stage is slow to minimize the temperature gradient across the glass-ceramic article. In some embodiments, the temperature $T_1$ where the transition from the first cooling stage to the second cooling stage occurs is determined based on the temperature below which the glass-ceramic article behaves as an elastic material. Without be bound by theory, it is believed that the slower cooling rate of the first cooling stage is only needed to control the temperature gradients until the glass-ceramic article reaches the temperature below which it behaves as an elastic material. In some embodiments, temperature $T_1$ may be in a range from 450° C. to 650° C. and all ranges and subranges therebetween. In some embodiments, temperature $T_1$ may be less than or equal to 650° C., 640° C., 630° C., 620° C., 610° C., 600° C., 590° C., 580° C., 570° C., 560° C., 550° C., 540° C., 530° C., 520° C., 510° C., 500° C., 490° C., 480° C., 470° C., 460° C., or 450° C. In some embodiments, the temperature drop in the first cooling stage ($T_{max}$–$T_1$) is less than the temperature drop in the second cooling stage ($T_1$–$T_{Room}$). Without be bound by theory, it is believed that temperature gradients that develop in the first cooling stage have a greater effect on the residual stresses (and therefore warp) in the glass-ceramic article upon reaching room temperature (in the form of optical retardance) than temperature gradients that develop in the second cooling stage. Thus, in some embodiments, after controlled cooling in the first cooling stage, the glass-ceramic article may be allowed to cool to room temperature in an uncontrolled cooling environment.

Figure 3:
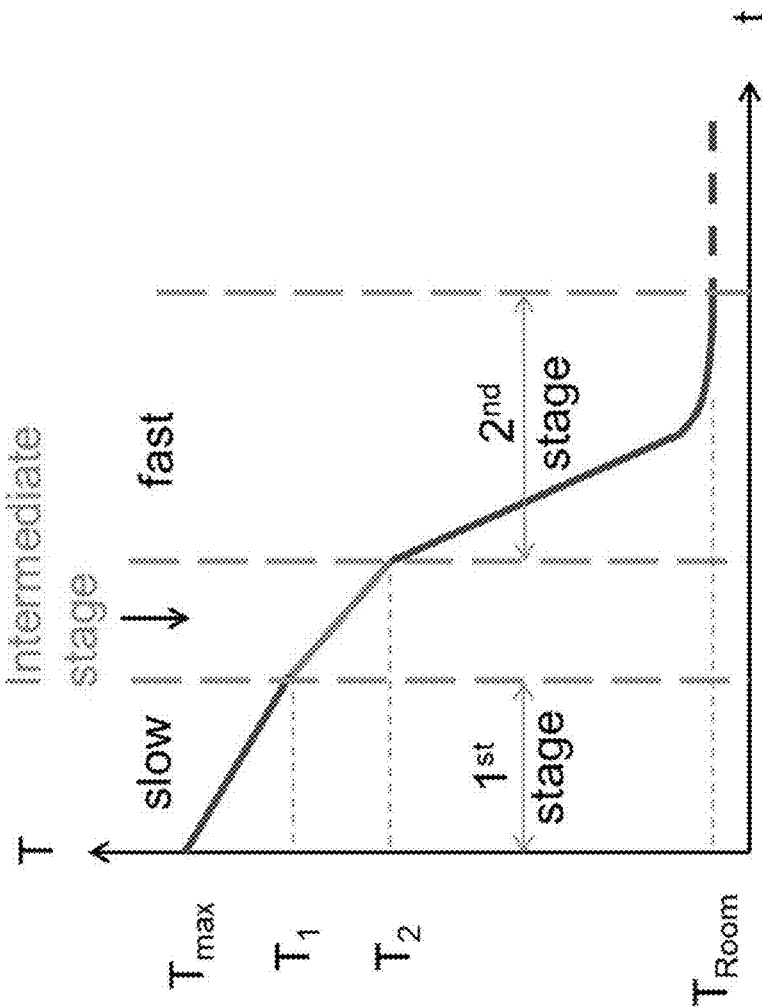
FIG. 3 is an exemplary diagram of another cooling cycle.

In some embodiments, as shown for example in FIG. 3, the cooling cycle may have an intermediate cooling stage in between the first cooling stage and the second cooling stage for a total of three cooling stages. In such embodiments, in the first cooling stage, the temperature cools from $T_{max}$ (i.e., $T_C$–the crystallization temperature) to $T_1$ at a first cooling rate. In the intermediate cooling stage, the temperature cools from $T_1$ to $T_2$ at a second cooling rate. In some embodiments $T_2$ may be below the strain point of the glass-ceramic, for example in a range from about 50° C. to about 200° C. In the second stage, the temperature cools from $T_2$ to about room temperature ($T_{Room}$) at a third cooling rate. As shown in FIG. 3, the cooling rate increases with each stage such that (i) the first cooling rate during the first cooling stage is less than the second cooling rate during the intermediate cooling stage and the third cooling rate during the second cooling stage and (ii) the second cooling rate during the intermediate cooling stage is less than the third cooling rate during the second cooling stage. In some embodiments, (i) the temperature drop in the first cooling stage ($T_{max}$–$T_1$) is less than the temperature drop in the intermediate cooling stage ($T_1$–$T_2$) and the temperature drop in the second cooling stage ($T_2$–$T_{Room}$) and (ii) the temperature drop in the intermediate cooling stage ($T_1$–$T_2$) is less than the temperature drop in the second cooling stage ($T_2$–$T_{Room}$). The intermediate cooling stages allows for a faster cooling cycle while still minimizing temperature gradients and residual stress. In some embodiments, $T_{max}$ may be about 740° C., $T_1$ may be about 640° C., and $T_2$ may be about 580° C.

In some embodiments, when having multiple cooling stages in the cooling cycle, the temperature gradients across a plane of the glass-ceramic article during the first cooling stage may be less than 20° C., less than 19° C., less than 18° C., less than 17° C., less than 16° C., less than 15° C., less than 14° C., less than 13° C., less than 12° C., less than 11° C., less than 10° C., less than 9° C., less than 8° C., less than 7° C., less than 6° C., less than 5° C., less than 4° C., or less than 3° C. and/or the optical retardance at room temperature of less than 40 nm/mm of thickness, less than 35 nm/mm of thickness, less than 30 nm/mm of thickness, less than 25 nm/mm of thickness, less than 200 nm/mm of thickness, less than 15 nm/mm of thickness, less than 14 nm/mm of thickness, less than 13 nm/mm of thickness, less than 12 nm/mm of thickness, less than 11 nm/mm of thickness, less than 10 nm/mm of thickness, less than 9 nm/mm of thickness, less than 8 nm/mm of thickness, less than 7 nm/mm of thickness, less than 6 nm/mm of thickness, less than 5 nm/mm of thickness, less than 4 nm/mm of thickness, or less than 3 nm/mm of thickness. The optical retardation may be measured using a photoelastic stress measurement system, such as the grey-field polariscope GFP-1400 available from Stress Photonics, Inc.

Upon performing the above heat treatments to the precursor glass, the resultant glass-ceramic has one or more crystalline phases and a residual glass phase. In some embodiments, the glass-ceramic contains the following exemplary crystalline phases: lithium disilicate, petalite, ß-spodumene solid solution, ß-quartz solid solution, lithium metasilicate, virgilite, cristobalite, lithium phosphate, baddeleyite and zirconia and any combinations thereof.

In some embodiments, lithium disilicate is the crystalline phase with the highest weight percentage. Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals. In some embodiments, the weight percentage of the lithium disilicate crystalline phase in the glass-ceramic compositions can be in a range from about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 60 wt %, about 35 to about 55 wt %, about 35 to about 50 wt %, about 35 to about 45 wt %, about 35 to about 40 wt %, about 40 to about 60 wt %, about 40 to about 55 wt %, about 40 to about 50 wt %, about 40 to about 45 wt %, about 45 to about 60 wt %, about 45 to about 55 wt %, about 45 to about 50 wt %, about 50 to about 60 wt %, about 50 to about 55 wt %, or about 55 to about 60 wt %. In some embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % lithium disilicate crystalline phase.

In some embodiments, petalite is the crystalline phase with the highest weight percentage. Petalite, $LiAlSi_4O_{10}$, is a monoclinic crystal possessing a three-dimensional framework structure with a layered structure having folded $Si_2O_5$ layers linked by Li and Al tetrahedra. The Li is in tetrahedral coordination with oxygen. The mineral petalite is a lithium source and is used as a low thermal expansion phase to improve the thermal downshock resistance of glass-ceramic or ceramic parts. Moreover, glass-ceramic articles based on the petalite phase can be chemically strengthened in a salt bath, during which $Na^+$ (and/or $K^+$) replaces $Li^+$ in the petalite structure, which causes surface compression and strengthening. In some embodiments, the weight percentage of the petalite crystalline phase in the glass-ceramic compositions can be in a range from about 20 to about 70 wt %, about 20 to about 65 wt %, about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 70 wt %, about 25 to about 65 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 70 wt %, about 30 to about 65 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 70 wt %, about 35 to about 65 wt %, about 35 to about 60 wt %, about 35 to about 55 wt %, about 35 to about 50 wt %, about 35 to about 45 wt %, about 35 to about 40 wt %, about 40 to about 70 wt %, about 40 to about 65 wt %, about 40 to about 60 wt %, about 40 to about 55 wt %, about 40 to about 50 wt %, about 40 to about 45 wt %, about 45 to about 70 wt %, about 45 to about 65 wt %, about 45 to about 60 wt %, about 45 to about 55 wt %, about 45 to about 50 wt %, about 50 to about 70 wt %, about 50 to about 65 wt %, about 50 to about 60 wt %, about 50 to about 55 wt %, about 55 to about 70 wt %, about 55 to about 65 wt %, about 55 to about 60 wt %, about 60 to about 70 wt %, about 60 to about 65 wt %, or about 65 to about 70 wt %. In some embodiments, the glass-ceramic has about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

In some embodiments, the crystalline phases other than lithium disilicate and petalite have a total wt % in the glass-ceramic article of less than 5 wt %, less than 4 wt %, less than 3 wt %, less than 2 wt %, or less than 1 wt %.

In some embodiments, the glass-ceramic has a residual glass content of about 5 to about 50 wt %, about 5 to about 45 wt %, about 5 to about 40 wt %, about 5 to about 35 wt %, about 5 to about 30 wt %, about 5 to about 25 wt %, about 5 to about 20 wt %, about 5 to about 15 wt % about 5 to about 10 wt %, about 10 to about 50 wt %, about 10 to about 45 wt %, about 10 to about 40 wt %, about 10 to about 35 wt %, about 10 to about 30 wt %, about 10 to about 25 wt %, about 10 to about 20 wt %, about 10 to about 15 wt %, about 15 to about 50 wt %, about 15 to about 45 wt %, about 15 to about 40 wt %, about 15 to about 35 wt %, about 15 to about 30 wt %, about 15 to about 25 wt %, about 15 to about 20 wt %, about 20 to about 50 wt %, about 20 to about 45 wt %, about 20 to about 40 wt %, about 20 to about 35 wt %, about 20 to about 30 wt % about 20 to about 25 wt %, about 25 to about 30 wt %, and all ranges and subranges therebetween. In some embodiments the residual glass content can be less than or equal to 50, 45, 40, 35, 30, 25, 20, 19, 18, 17, 16, 15, 14, 13, 12, 11, 10, 9, 8, 7, 6, 5, 4, 3, 2, or 1 wt %.

In some embodiments, the glass-ceramic may have a weight percentage of crystals in a range from greater than 20 wt % to 100 wt %, greater than 20 wt % to 90 wt %, greater than 20 wt % to 80 wt %, greater than 20 wt % to 70 wt %, 30 wt % to 100 wt %, 30 wt % to 90 wt %, 30 wt % to 80 wt %, 30 wt % to 70 wt %, 40 wt % to 100 wt %, 40 wt % to 90 wt %, 40 wt % to 80 wt %, 40 wt % to 70 wt %, 50 wt % to 100 wt %, 50 wt % to 90 wt %, 50 wt % to 80 wt %, 50 wt % to 70 wt %, and all ranges and subranges therebetween. In some embodiments, the inner region may have a weight percentage of crystals greater than 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %.

The grain size of the crystals in the crystalline phases is a factor that affects the transparency of the glass-ceramic. In some embodiments, the grains have a longest dimension in a range from about 5 nm to about 150 nm, about 5 nm to about 125 nm, about 5 nm to about 100 nm, about 5 nm to about 75 nm, about 5 nm to about 50 nm, about 25 nm to about 150 nm, about 25 nm to about 125 nm, about 25 nm to about 100 nm, about 25 nm to about 75 nm, about 50 nm to about 150 nm, about 50 nm to about 125 nm, about 50 nm to about 100 nm, and all ranges and subranges therebetween. In some embodiments, the longest dimension of the grains is less than 150 nm, less than 125 nm, less than 100 nm, less than 75 nm, less than 50 nm, or less than 25 nm. The longest dimension of the grains is measured using a scanning electron microscope (SEM).

In some embodiments, the phase assemblage and heat treatment conditions are chosen to create a glass-ceramic article with suitable optical properties, such as transparency and low haze, for use as a cover glass for a mobile electronic device. In some embodiments, the glass-ceramic article is transparent in that it has an average transmittance of 85% or greater, 86% or greater, 87% or greater, 88% or greater, 89% or greater, 90% or greater, 91% or greater, 92% or greater, 93% or greater (including surface reflection losses) of light over the wavelength range from 450 nm to 600 nm for a glass-ceramic article having a thickness of 1 mm. In other embodiments, glass-ceramic may be translucent over the wavelength range from 450 nm to 600 nm. In some embodiments a translucent glass-ceramic can have an average transmittance in a range from about 20% to less than about 85% of light over the wavelength range of about 450 nm to about 800 nm for a glass-ceramic article having a thickness of 1 mm. In some embodiments, the glass-ceramic article has a haze of less than 0.2, 0.19, 0.18, 0.17, 0.16, 0.15, 0.14, 0.13, 0.12, 0.11. or 0.1.

Equation (2) below estimates the haze of a glass-ceramic article based on the nucleation temperature (TN), the nucleation hold time (tN), the crystallization temperature (TC), and the crystallization hold time (tC).

$$\text{Estimated haze} = 103 - 0.260\,T_N + 0.000203(T_N)^2 - \tag{2}$$
$$7.96\,t_N + 0.1532(t_N)^2 - 0.019\,T_C - 0.000008(T_C)^2 -$$
$$10.03\,t_C + 0.00597\,T_N * t_N + 0.00463\,t_N * T_C + 0.01342\,T_C * t_C$$

In some embodiments, the nucleation temperature (TN), the nucleation hold time (tN), the crystallization temperature (TC), and the crystallization hold time (tC) for the heat treatment cycle can be selected based on the estimated haze provide by Equation (2) to have an estimated haze of less than 0.2, 0.19, 0.18, 0.17, 0.16, 0.15, 0.14, 0.13, 0.12, 0.11. or 0.1. In some embodiments, the heat treatment may include (i) heating precursor glasses at a rate of 0.01-50° C./min to a nucleation temperature (Tn); (ii) maintaining the crystallizable glasses at the nucleation temperature for first predetermined period of time ($t_N$) to produce a nucleated crystallizable glass compositions; (iii) heating the nucleated crystallizable glasses at a rate in the range from about 0.01° C./min to about 50° C./min to a crystallization temperature (Tc); (iv) maintaining the nucleated crystallizable glasses at the crystallization temperature for a second predetermined period of time ($t_C$) to produce the glass-ceramic articles described herein; and (v) cooling the formed glass-ceramic to room temperature, such that the value of Equation (2) is less than 0.2, 0.19, 0.18, 0.17, 0.16, 0.15, 0.14, 0.13, 0.12, 0.11. or 0.1.

Ion Exchange

In some embodiments, the glass-ceramic article is capable of being chemically strengthened using one or more ion exchange techniques. In these embodiments, ion exchange can occur by subjecting one or more surfaces of such glass-ceramic article to one or more ion exchange mediums (for example molten salt baths), having a specific composition and temperature, for a specified time period to impart to the one or more surfaces with compressive stress layer(s). In some embodiments, the ion exchange medium is a molten bath containing an ion (for example an alkali metal ion) that is larger than an ion (for example an alkali metal ion) present in the glass-ceramic article wherein the larger ion from the molten bath is exchanged with the smaller ion in the glass-ceramic article to impart a compressive stress in the glass-ceramic article, and thereby increases the strength of the glass-ceramic article.

In some embodiments, a one step ion exchange process can be used and in other embodiments, a multi step ion exchange process can be used. In some embodiments, for both one step and multi step ion exchange processes the ion exchange mediums (for example, molten baths) can include 100 wt % of a sodium-containing salt (for example, NaNO₃) or can include a mixed salt bath, for example a combination of a sodium-containing salt (for example, NaNO₃) and a potassium-containing salt (for example KNO₃). In some embodiments, when the molten salt bath contains a sodium-containing salt (for example, NaNO₃) in a range from 3 wt % to 100 wt %, 3 wt % to 95 wt %, 3 wt % to 90 wt %, 3 wt % to 85 wt %, 3 wt % to 80 wt %, 3 wt % to 75 wt %, 5 wt % to 100 wt %, 5 wt % to 95 wt %, 5 wt % to 90 wt %, 5 wt % to 85 wt %, 5 wt % to 80 wt %, 5 wt % to 75 wt %, 10 wt % to 100 wt %, 10 wt % to 95 wt %, 10 wt % to 90 wt %, 10 wt % to 85 wt %, 10 wt % to 80 wt %, 10 wt % to 75 wt %, 20 wt % to 100 wt %, 20 wt % to 95 wt %, 20 wt % to 90 wt %, 20 wt % to 85 wt %, 20 wt % to 80 wt %, 20 wt % to 75 wt %, 30 wt % to 100 wt %, 30 wt % to 95 wt %, 30 wt % to 90 wt %, 30 wt % to 85 wt %, 30 wt % to 80 wt %, 30 wt % to 75 wt %, and all ranges and subranges therebetween. In some embodiments, other sodium and potassium salts may be used in the ion exchange solution, such as, for example sodium or potassium nitrites, phosphates, or sulfates.

After an ion exchange process is performed, it should be understood that a composition at the surface of the glass-ceramic may be different than the composition of the as-formed glass-ceramic (i.e., the glass-ceramic before it undergoes an ion exchange process). This results from one type of alkali metal ion in the as-formed glass-ceramic, such as, for example Li⁺ or Na⁺, being replaced with larger alkali metal ions, such as, for example Na⁺ or K⁺, respectively. However, the composition of the glass-ceramic at or near the center of the depth of the glass-ceramic article will, in embodiments, still have the composition of the as-formed glass-ceramic.

End Products

Figures 4A, 4B:
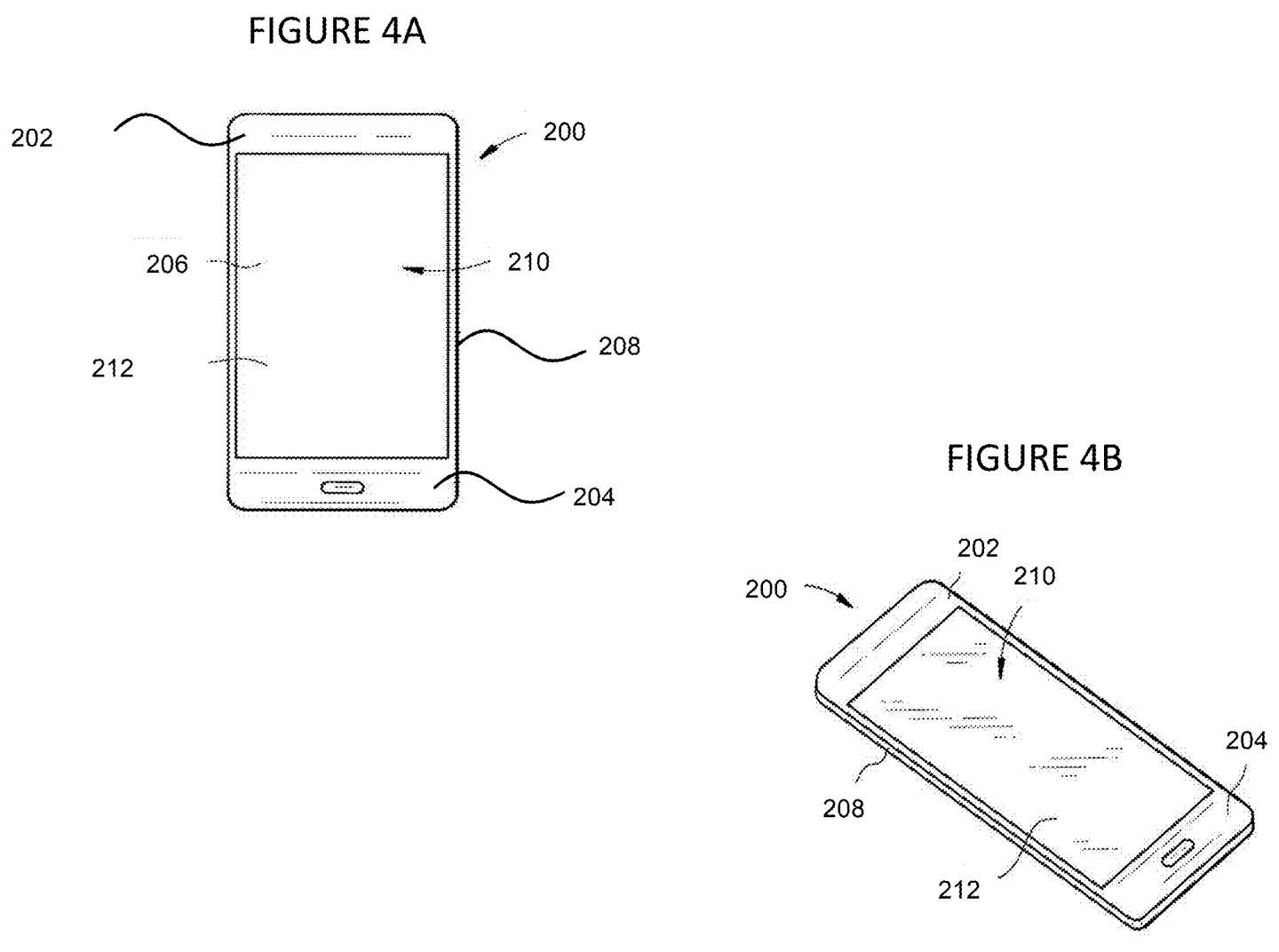

The glass-ceramic articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc. for example for use an interior display cover, a window, or windshield), appliance articles, or any article that requires some transparency, scratch-resistance, abrasion resistance or a combination thereof. An exemplary article incorporating any of the strengthened glass-ceramic articles disclosed herein is shown in FIGS. 4A and 4B. Specifically, FIGS. 4A and 4B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least one of the cover substrate 212 or a portion of housing 202 may include any of the glass-ceramic strengthened articles disclosed herein.

EXAMPLES

Various embodiments will be further clarified by the following examples.

Example 1

Figure 5:
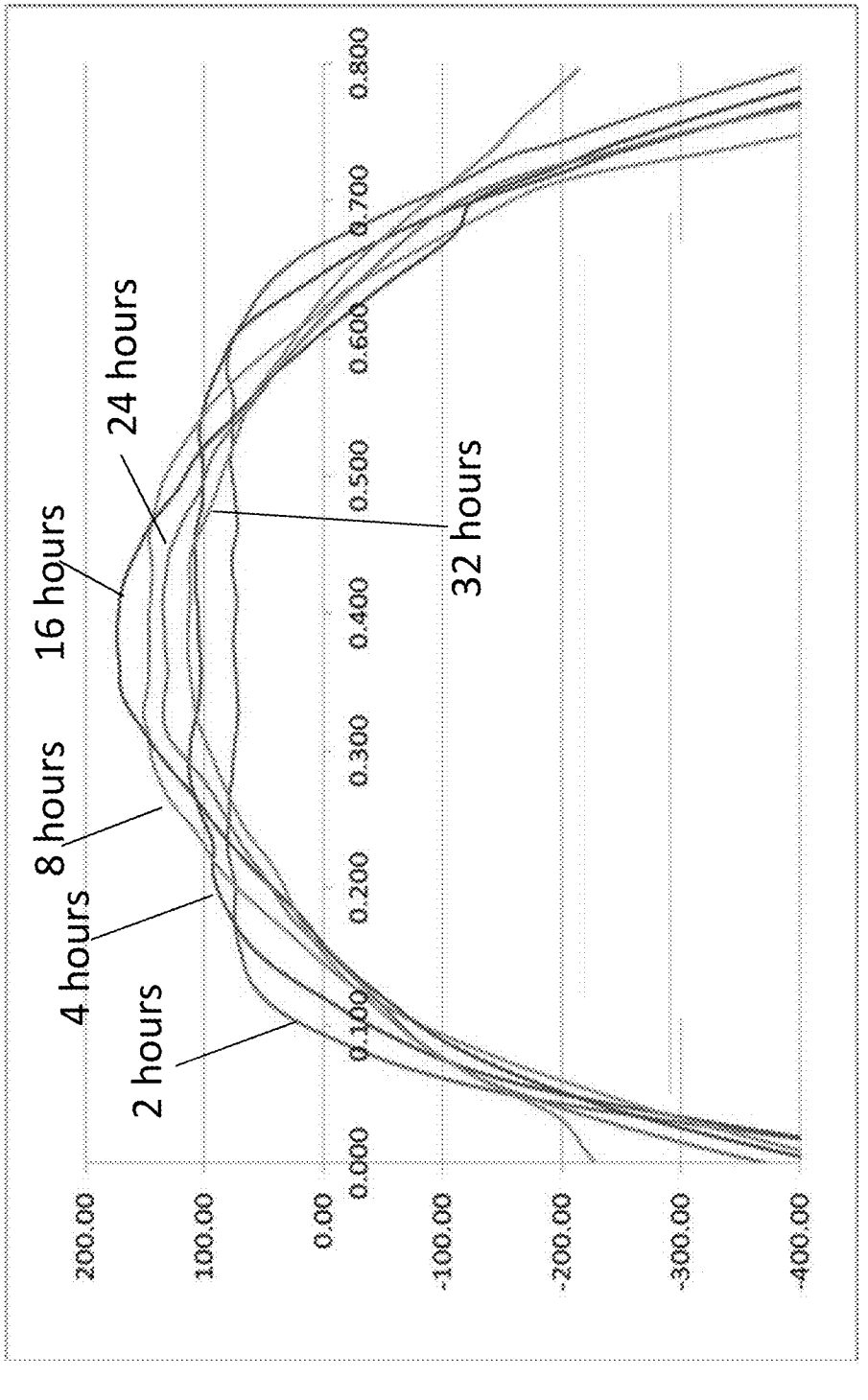
FIG. 5 is a plot of the stress profiles from Example 1.

Precursor glass samples having a thickness of 0.8 mm were formed having a composition of composition 3 listed in Table 1 above. The samples were heated from room temperature to approximately 560° C. at a heating rate of 5° C./min and held for 4 hours. Then the samples were heated to 730° C. at a heating rate of 5° C./min and held for 1 hour and a glass-ceramic article was formed. The glass-ceramic samples were then ion exchanged in a molten salt bath containing 95 wt % $NaNO_3$ and 5 wt % $KNO_3$ at 470° C. A first sample was ion exchanged for 2 hours, a second sample was ion exchanged for 4 hours, a third sample was ion exchanged for 7 hours, a fourth sample was ion exchanged for 16 hours, and a fifth sample was ion exchanged from 24 hours. The stress profiles for each of the samples is shown in FIG. 5 with the CT being shown a positive stress and the CS being shown as negative stress. The sample ion exchanged for 16 hours had a max CT about 135 MPa, a stored tensile stress of about 37 $J/m^2$ and broke into 2 fragments when subjected to the Fragment Test.

Example 2

Precursor glass samples having a thickness of 0.8 mm were formed having a composition of composition 3 listed in Table 1 and comparative composition 1 listed in Table 2 below.

TABLE 2

| Composition | Comparative Composition 1 |
|---|---|
| $SiO_2$ (mol %) | 70.30 |
| $Al_2O_3$ (mol %) | 4.23 |
| $B_2O_3$ (mol %) | 0 |
| $Li_2O$ (mol %) | 21.36 |
| $Na_2O$ (mol %) | 1.51 |
| $K_2O$ (mol %) | 0 |
| $P_2O_5$ (mol %) | 0.87 |
| $ZrO_2$ (mol %) | 1.66 |
| $Li_2O/R_2O$ | 0.93 |

Figure 6:
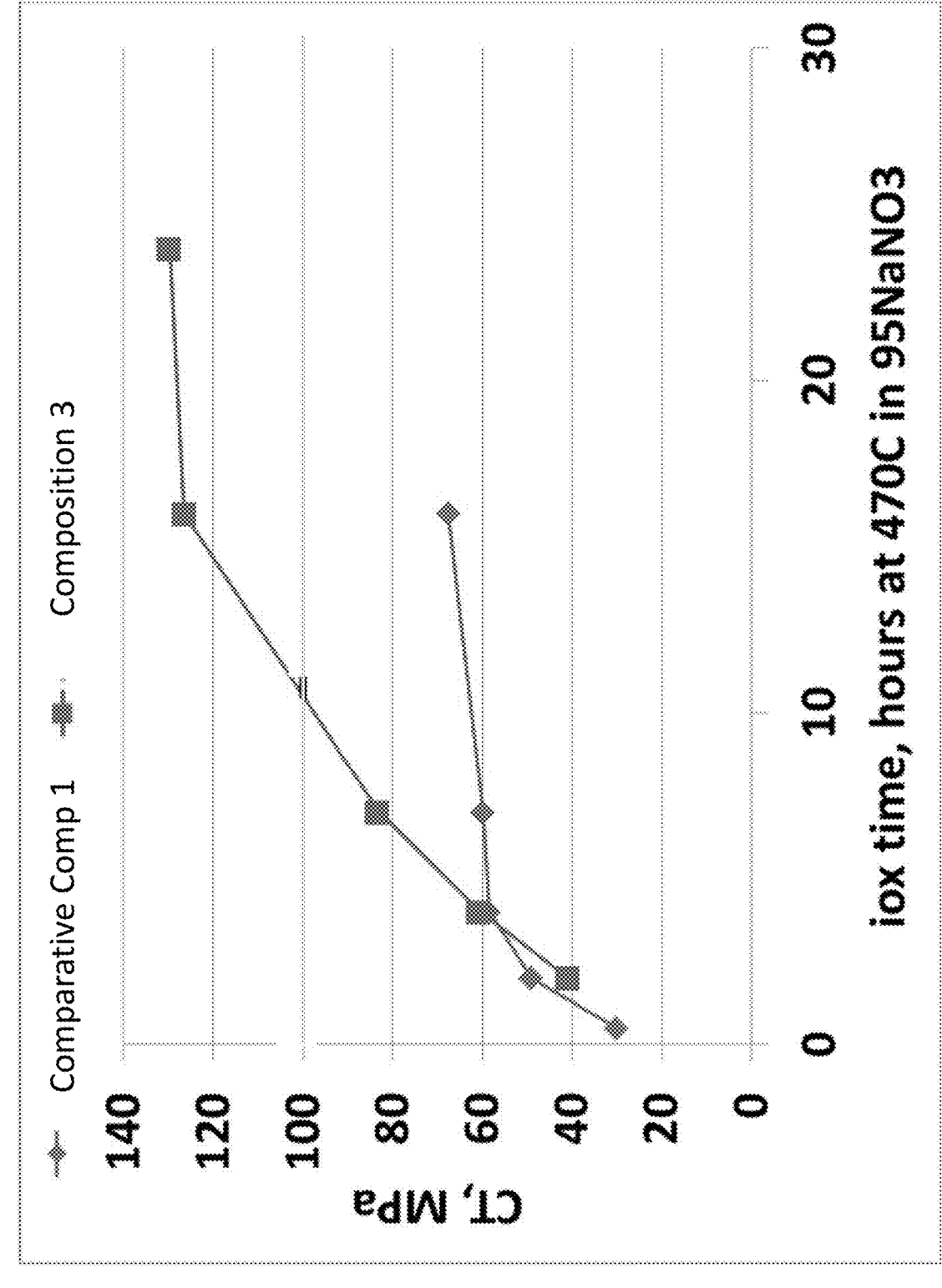
FIG. 6 is a plot of the central tension over increasing ion exchange durations from Example 2.

The glass samples were then heated from room temperature to approximately 560° C. at a heating rate of 5° C./min and held for 4 hours. Then the samples were heated to 730° C. at a heating rate of 5° C./min and held for 1 hour and a glass-ceramic article was formed. The glass-ceramic samples were then ion exchanged in a molten salt bath containing 95 wt % $NaNO_3$ and 5 wt % $KNO_3$ at 470° C. A first set samples was ion exchanged for 2 hours, a second set of samples was ion exchanged for 4 hours, a third set of samples was ion exchanged for 7 hours, a fourth set of samples was ion exchanged for 16 hours, and a fifth sample (for composition 3 only) was ion exchanged from 24 hours. FIG. 6 is a plot showing the maximum CT of each sample on the y axis vs the ion exchange time on the x axis. The glass-ceramic articles made from composition 3 achieved a maximum CT of approximately 135 MPa, whereas the glass-ceramic articles made from comparative composition 1 did not achieve the desired maximum CT of greater than 90 MPa (it reached about 70 MPa). Without being bound by theory, it is believed that the higher mol % of $ZrO_2$ in composition 3 allowed the glass-ceramic made from composition 3 to achieve a higher CT. Without being bound by theory, it is believed that a $ZrO_2$ concentration of 1.7 mol % or greater results in an ion-exchanged glass-ceramic article with a maximum CT of greater than 90 MPa and a stored tensile energy of greater than 22 $J/m^2$.

Example 3

Figure 7:
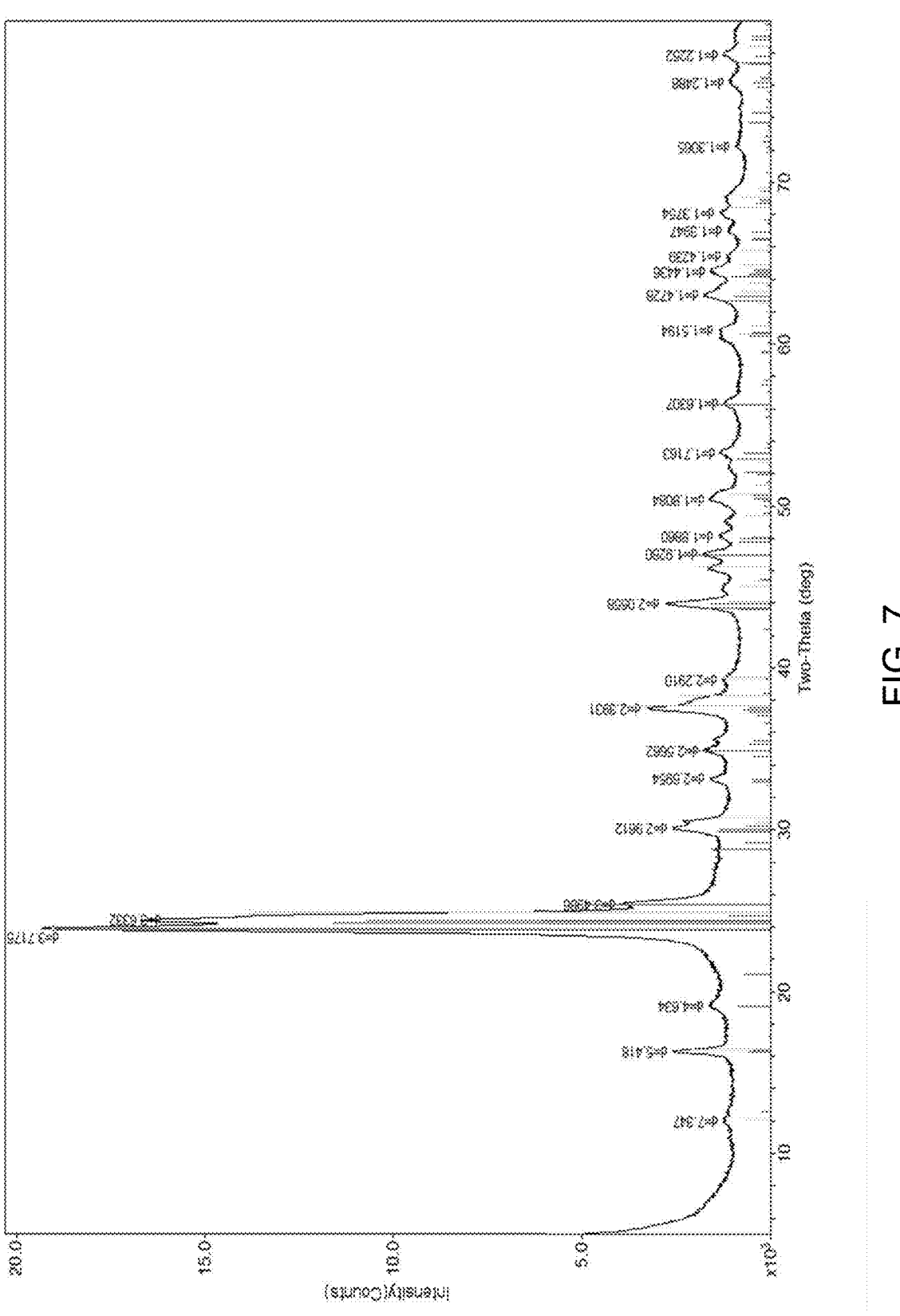
FIG. 7 is the phase assemblage of the glass-ceramic from Example 3.
Figure 8:
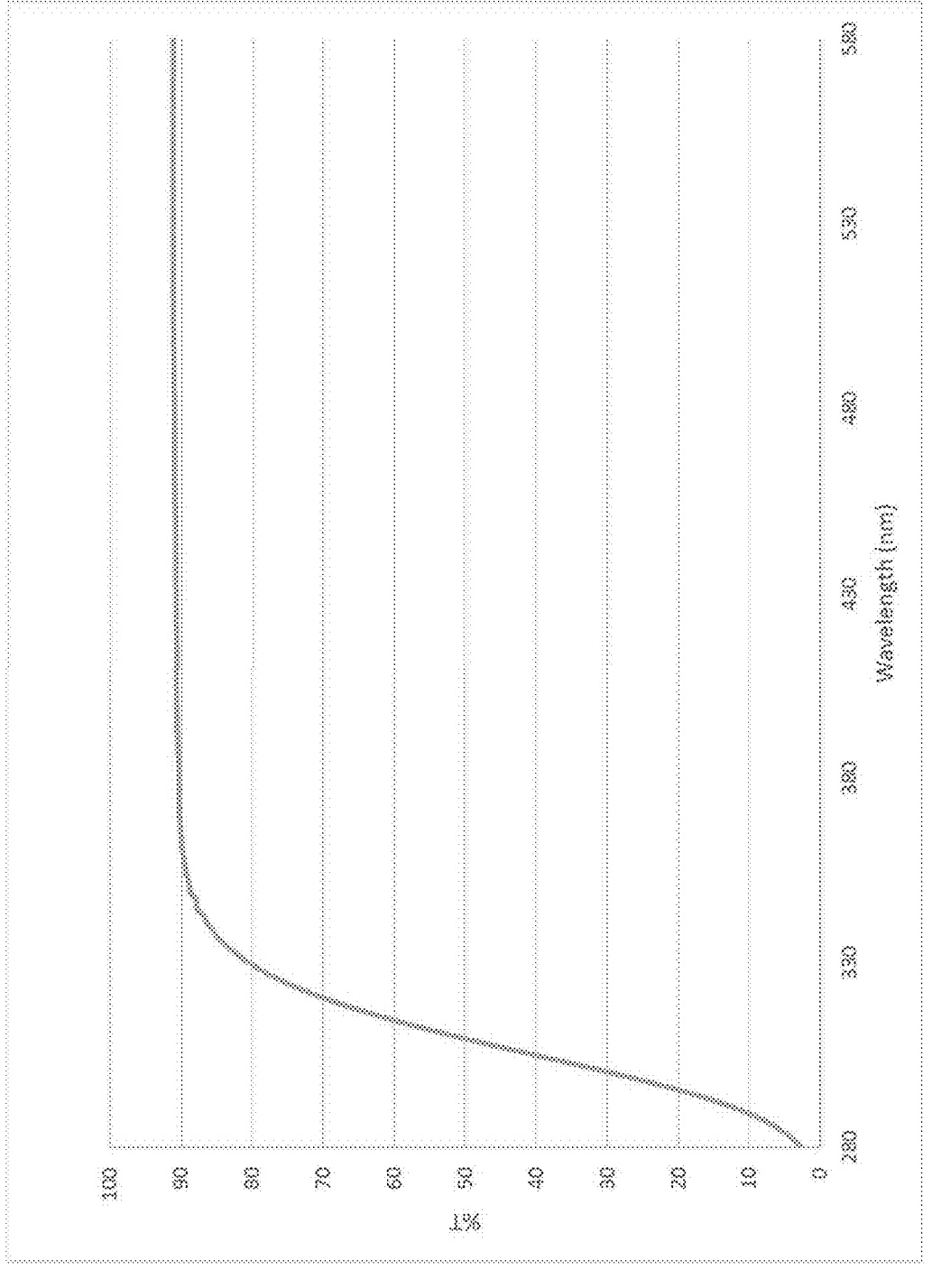
FIG. 8 is a plot of the transmittance of the glass-ceramic from Example 3.

Precursor glass samples having a thickness of 0.8 mm were formed having a composition of composition 1 listed in Table 1 above. The samples were heated from room temperature to approximately 570° C. at a heating rate of 5° C./min and held for 4 hours. Then the samples were heated to 740° C. at a heating rate of 5° C./min and held for 1 hour and a glass-ceramic article was formed. The glass-ceramic article was cooled to room temperature at a cooling rate of 5° C./min. The phase assemblage of the glass-ceramic article was about 12+/−2 wt % residual glass; 44+/−2 wt % petalite crystalline phase, and 44+/−2 wt % lithium disilicate crystalline phase. The sum of all other crystalline phases (e.g., other than petalite and lithium disilicate) was less than 2 wt %. FIG. 7 is the X-ray diffraction (XRD) results with the Reitveld analysis for the phase assemblage. The glass-ceramic had a 90% transmission in the visible wavelengths as shown in FIG. 8.

Example 4

Precursor glass samples having a thickness of 0.8 were formed having a composition of composition 1 listed in Table 1 above. The samples were subjected to the heat treatment cycle shown in Table 3 below along with the phase assemblage and haze. As can be seen the heat treatment cycle affects the phase assemblage and the haze. In particular, the haze is below 0.2 when the wt % of the crystalline phases other than lithium disilicate and petalite is less than 2 wt % of the glass-ceramic article.

TABLE 3

| Sample | Nucl. temp (° C.) | Nucl. Time (hours) | Crystal'n temp (° C.) | Crystal'n Time (hours) | Residual Glass phase (wt %) | Lithium Disilicate (wt %) | Petalite (wt %) | Lithium Meta-silicate (wt %) | Virgilite (wt %) | Cristo-balite (wt %) | Haze |
|---|---|---|---|---|---|---|---|---|---|---|---|
| 1 | 570 | 4 | 725 | 1.5 | 13 | 43 | 44 | | | | 0.14 |
| 2 | 570 | 4 | 730 | 1 | 14 | 43 | 43 | | | | 0.16 |
| 3 | 580 | 4 | 730 | 1 | 13 | 43 | 44 | | | | 0.16 |
| 4 | 580 | 3 | 730 | 1 | 14 | 43 | 43 | | | | 0.16 |
| 5 | 585 | 2.75 | 740 | 1 | 13 | 44 | 43 | | | | 0.13 |
| 6 | 585 | 2.75 | 740 | 1 | 13 | 44 | 43 | | | | 0.14 |
| 7 | 585 | 2.75 | 740 | 1 | 13 | 44 | 43 | | | | 0.14 |
| 8 | 585 | 2.75 | 740 | 1 | 12 | 44 | 44 | | | | 0.14 |
| 9 | 585 | 2.75 | 740 | 1 | 12 | 44 | 44 | | | | 0.14 |
| 10 | 585 | 2.75 | 740 | 2 | 13 | 44 | 44 | | | | 0.14 |
| 11 | 585 | 2.75 | 740 | 1 | 14 | 43 | 44 | | | | 0.14 |
| 12 | 585 | 2.75 | 740 | 1 | 12 | 44 | 43 | | | | 0.15 |
| 13 | 585 | 2.75 | 740 | 1 | 13 | 45 | 42 | | | | 0.16 |
| 14 | 585 | 2.75 | 740 | 1 | 12 | 45 | 43 | | | | 0.16 |
| 15 | 580 | 2 | 740 | 1 | 12 | 44 | 44 | | | | 0.17 |
| 16 | 580 | 2 | 750 | 1 | 13 | 43 | 44 | | | | 0.20 |
| 17 | 580 | 3 | 755 | 0.5 | 13 | 44 | 42 | | | | 0.13 |

TABLE 3-continued

| Sample | Nucl. temp (° C.) | Nucl. Time (hours) | Crystal'n temp (° C.) | Crystal'n Time (hours) | Residual Glass phase (wt %) | Lithium Disilicate (wt %) | Petalite (wt %) | Lithium Meta-silicate (wt %) | Virgilite (wt %) | Cristo-balite (wt %) | Haze |
|---|---|---|---|---|---|---|---|---|---|---|---|
| 18 | 600 | 2 | 755 | 0.25 | 13 | 44 | 43 | | <1 | | 0.14 |
| 19 | 570 | 4 | 755 | 1.5 | 13 | 45 | 42 | | | | 0.16 |
| 20 | 570 | 4 | 755 | 0.5 | 12 | 44 | 44 | | | | 0.16 |
| 21 | 600 | 2 | 755 | 0.75 | 13 | 43 | 44 | | <1 | | 0.16 |
| 22 | 600 | 1.5 | 755 | 0.5 | 13 | 43 | 45 | | — | | 0.17 |
| 23 | 600 | 1.5 | 755 | 1.5 | 13 | 42 | 44 | | <1 | | 0.2 |
| 24 | 600 | 1 | 765 | 0.25 | 13 | 42 | 45 | | trace | | 0.17 |
| 25 | 600 | 2 | 765 | 0.5 | 13 | 43 | 45 | | <1 | | 0.18 |
| 26 | 590 | 1 | 765 | 0.25 | 13 | 42 | 45 | | trace | | 0.19 |
| 27 | 605 | 2 | 770 | 0.5 | 12 | 43 | 44 | | <1 | | 0.15 |
| 28 | 600 | 2 | 770 | 0.25 | 12 | 42 | 45 | | <1 | | 0.17 |
| 29 | 610 | 1 | 770 | 0.01 | 13 | 43 | 44 | | | | 0.18 |
| 30 | 605 | 2 | 770 | 0.01 | 12 | 44 | 44 | | <1 | | 0.18 |
| 31 | 600 | 1 | 770 | 0.25 | 13 | 43 | 44 | | trace | | 0.18 |
| 32 | 600 | 2 | 775 | 0.25 | 13 | 43 | 44 | | 1 | | 0.2 |
| 33 | 610 | 1 | 780 | 0.01 | 12 | 42 | 45 | | <1 | | 0.20 |
| 34 | 590 | 2 | 730 | 1 | 14 | 41 | 45 | | | | 0.19 |
| 35 | 580 | 2 | 730 | 1 | 11 | 41 | 46 | 2 | | — | 0.19 |
| 36 | 600 | 4 | 755 | 0.5 | 13 | 45 | 41 | | 1 | | 0.18 |
| 37 | 600 | 2.5 | 770 | 0.25 | 13 | 43 | 43 | | 1 | | 0.18 |
| 38 | 585 | 2.75 | 770 | 1 | 13 | 43 | 43 | | <1 | | 0.22 |
| 39 | 590 | 1 | 770 | 0.25 | 13 | 44 | 43 | | <1 | | 0.23 |
| 40 | 600 | 2 | 775 | 0.75 | 13 | 42 | 43 | | 2 | | 0.28 |
| 41 | 605 | 2 | 780 | 0.5 | 13 | 41 | 42 | | 3 | | 0.38 |
| 42 | 585 | 2.75 | 710 | 1 | 14 | 36 | 46 | 3 | | | 0.37 |
| 43 | 600 | 4 | 725 | 1.5 | 15 | 39 | 45 | 2 | — | — | 0.2 |
| 44 | 600 | 1.5 | 725 | 1.5 | 13 | 39 | 46 | 2 | | | 0.23 |
| 45 | 570 | 4 | 725 | 0.5 | 14 | 45 | 42 | 4 | | | 0.23 |
| 46 | 600 | 4 | 725 | 0.5 | 16 | 35 | 45 | 4 | | — | 0.24 |
| 47 | 600 | 1.5 | 725 | 0.5 | 12 | 40 | 42 | 3 | | 3 | 0.28 |
| 48 | 570 | 1.5 | 725 | 1.5 | 15 | 36 | 45 | 4 | | | 0.37 |
| 49 | 570 | 1.5 | 725 | 0.5 | 18 | 26 | 46 | 8 | — | 2 | 1.53 |
| 50 | 560 | 4 | 730 | 1 | 12 | 39 | 46 | 3 | | | 0.29 |
| 51 | 585 | 5.25 | 740 | 1 | 13 | 43 | 44 | 4 | | | 0.23 |
| 52 | 585 | 2.75 | 740 | 0.01 | 11 | 38 | 46 | 3 | | <1 | 0.24 |
| 53 | 615 | 2.75 | 740 | 1 | 15 | 37 | 45 | 2 | 1 | trace | 0.27 |
| 54 | 555 | 2.75 | 740 | 1 | 17 | 32 | 46 | 5 | <1 | trace | 0.70 |
| 55 | 585 | 0.25 | 740 | 1 | 16 | 28 | 47 | 5 | <1 | 4 | 2.29 |
| 56 | 570 | 1.5 | 755 | 0.5 | 13 | 43 | 43 | — | 1 | — | 0.21 |
| 57 | 600 | 4 | 755 | 1.5 | 13 | 42 | 43 | — | 1 | — | 0.25 |
| 58 | 570 | 1.5 | 755 | 1.5 | 14 | 41 | 44 | — | 1 | — | 0.38 |
| 59 | 600 | 2 min | 755 | 0.5 min | 22 | 15 | 48 | 10 | | 6 | 7.45 |

Example 5

Precursor glass samples having a thickness of 0.8 were formed having a composition of composition 1 listed in Table 1 above. The samples were subjected to the heat treatment cycle shown in Table 4 below and the phase assemblage is shown in Table 5 below. The heat treatment cycle in this example differs from the heat treatment cycles of Example 4 in that there is a 3-step heat cycle instead of a 2-step heat cycle. In particular, the samples are held at an intermediate temperature, wherein the intermediate temperature is greater than the nucleation temperature and less than the crystallization temperature. This example demonstrates that the desired phase assemblage—where the wt % of the crystalline phases other than lithium disilicate and petalite is less than 2 wt % of the glass-ceramic article—can be achieved with 3-step heat treatment cycle instead of a 2-step heat treatment cycle.

TABLE 4

| Sample | Nucleation temperature (° C.) | Nucleation time (hours) | Intermediate step temperature (° C.) | Intermediate step time (hours) | Crystallization temperature (° C.) | Crystallization time (hours) |
|---|---|---|---|---|---|---|
| 1 | 570 | 3 | 680 | 0.5 | 740 | 0.5 |
| 2 | 570 | 3 | 680 | 1 | 740 | 1 |
| 3 | 570 | 4 | 680 | 1 | 740 | 0.01 |
| 4 | 570 | 4 | 680 | 0.5 | 740 | 0.5 |
| 5 | 570 | 4 | 680 | 1 | 740 | 1 |
| 6 | 570 | 4 | 650 | 1 | 740 | 1 |
| 7 | 570 | 4 | 670 | 0.5 | 740 | 1 |

TABLE 5

| Sample | Residual Glass phase (wt %) | Lithium Disilicate (wt %) | Petalite (wt %) | Lithium Metasilicate (wt %) | Virgilite (wt %) | Cristobalite (wt %) |
|---|---|---|---|---|---|---|
| 1 | 12 | 44 | 44 | — | — | — |
| 2 | 13 | 43 | 44 | — | — | — |
| 3 | 14 | 42 | 43 | — | — | — |
| 4 | 13 | 44 | 43 | — | — | — |
| 5 | 13 | 44 | 43 | — | — | — |
| 6 | 13 | 44 | 43 | — | — | — |
| 7 | 12 | 46 | 42 | — | — | — |

Example 6

Precursor glass samples having a thickness of 0.8 were formed having a composition of composition 1 listed in Table 1 above. The samples were subjected to the heat treatment cycle shown in Table 6 below and the phase assemblage is shown in Table 7 below. The heat treatment cycle in this example differs from the heat treatment cycles of Example 4 in that the sample is not held at the nucleation temperature, but rather is heated to various temperatures at varying heating rates until the crystallization temperature is reached. This example demonstrates that the desired phase assemblage—where the wt % of the crystalline phases other than lithium disilicate and petalite is less than 2 wt % of the glass-ceramic article—can be achieved with this alternative heat treatment cycle.

TABLE 6

| Step # | Cycle A Temperature change | Cycle A Heating Rate (deg ° C./min) | Cycle B Temperature change | Cycle B Heating Rate (deg ° C./min) |
|---|---|---|---|---|
| 1 | Room Temp to 560° C. | 5 | Room Temperature to 555° C. | 5 |
| 2 | 560° C. to 590° C. | 0.25 | 555° C. to 580° C. | 0.2 |
| 3 | 590° C. to 600° C. | 0.55 | 580° C. to 590° C. | 0.3 |
| 4 | 600° C. to 610° C. | 1 | 590° C. to 610° C. | 0.6 |
| 5 | 610° C. to 620° C. | 1.25 | 610° C. to 620° C. | 1 |
| 6 | 620° C. to 640° C. | 1.65 | 620° C. to 630° C. | 1.5 |
| 7 | 640° C. to 740° C. | 3 | 630° C. to 740° C. | 3 |
| 8 | Isothermal at 740° C. for 1 hour. | | Isothermal at 740° C. for 1 hour. | |

TABLE 7

| Cycle | Residual Glass phase (wt %) | Lithium Disilicate (wt %) | Petalite (wt %) | Lithium Metasilicate (wt %) | Virgilite (wt %) | Cristobalite (wt %) |
|---|---|---|---|---|---|---|
| A | 12 | 46 | 42 | — | — | — |
| B | 12 | 45 | 44 | — | — | — |

It will be apparent to those skilled in the art that various modifications and variations can be made without departing from the spirit or scope of the invention. For example, the various elements of the present disclosure may be utilized in combinations according to the following embodiments.

Embodiment 1. A glass-ceramic article comprising:
a first surface;
a second surface opposing the first surface;
one or more crystalline phases;
a residual glass phase;
a compressive stress layer extending from the first surface to a depth of compression (DOC);

a maximum central tension greater than 70 MPa;
a stored tensile energy greater than 22 J/m$^2$;
a fracture toughness greater than 1.0 MPa√m, wherein the fracture toughness is measured for a glass-ceramic having a composition and phase assemblage equivalent to the composition and phase assemblage at a center of the glass-ceramic article; and
a haze less than 0.2.

Embodiment 2. The glass-ceramic article of Embodiment 1 further comprising a Young's modulus greater than 95 GPa, wherein the Young's modulus is measured for a glass-ceramic having a composition and phase assemblage equivalent to the composition and phase assemblage at a center of the glass-ceramic article.

Embodiment 3. The glass-ceramic article of any preceding Embodiment, wherein the fracture toughness is in a range from greater than 1.0 MPa√m to 2.0 MPa√m.

Embodiment 4. A glass-ceramic article comprising:
a first surface;
a second surface opposing the first surface;
one or more crystalline phases;
a residual glass phase;
a compressive stress layer extending from the first surface to a depth of compression (DOC);
a maximum central tension greater than 70 MPa;
a stored tensile energy greater than 22 J/m$^2$;

Young's modulus greater than 95 GPa, wherein the Young's modulus is measured for a glass-ceramic having a composition and phase assemblage equivalent to the composition and phase assemblage at a center of the glass-ceramic article; and a haze less than 0.2.

Embodiment 5. The glass-ceramic article of Embodiment 4, wherein the Young's modulus is in a range from greater than 95 GPa to 110 GPa.

Embodiment 6. The glass-ceramic article of any preceding Embodiment, wherein a ratio of $Li_2O$ (mol %)/$R_2O$ (mol %) is greater than 0.85, wherein $R_2O$ is a sum of alkali metal oxides.

Embodiment 7. The glass-ceramic article of Embodiment 6, further comprising $ZrO_2$ in a range from 1.7 mol % to 4.5 mol %.

Embodiment 8. A glass-ceramic article comprising:

a first surface;

a second surface opposing the first surface;

one or more crystalline phases;

a residual glass phase;

a compressive stress layer extending from the first surface to a depth of compression (DOC);

a maximum central tension greater than 70 MPa;

a stored tensile energy greater than 22 $J/m^2$;

$ZrO_2$ in a range from 1.7 mol % to 4.5 mol %; and a ratio of $LiO_2$ (mol %)/$R_2O$ (mol %) is greater than 0.85, wherein $R_2O$ is a sum of alkali metal oxides.

Embodiment 9. The glass-ceramic article of any preceding Embodiment, wherein the residual glass phase is less than or equal to 50 wt % of the glass-ceramic article.

Embodiment 10. The glass-ceramic article of any preceding Embodiment, wherein the one or more crystalline phases comprises petalite.

Embodiment 11. The glass-ceramic article of any preceding Embodiment, wherein the one or more crystalline phases comprises lithium disilicate.

Embodiment 12. The glass-ceramic article of any preceding Embodiment, wherein a sum of crystalline phases other than lithium disilicate and petalite is less than 2 wt % of the glass-ceramic article.

Embodiment 13. The glass-ceramic article of any preceding Embodiment, wherein the glass-ceramic article is transparent and has a transmittance of at least 85% for light in a wavelength range from 450 nm to 800 nm at a thickness of 1 mm.

Embodiment 14. The glass-ceramic article of any preceding Embodiment, wherein the glass-ceramic article breaks into less than 5 fragments when subjected to the Fragment Test.

Embodiment 15. The glass-ceramic article of any preceding Embodiment, wherein the maximum central tension is in a range from greater than 90 MPa to 180 MPa.

Embodiment 16. The glass-ceramic article of any preceding Embodiment, wherein the stored tensile energy is in a range from greater than 22 $J/m^2$ to 60 $J/m^2$.

Embodiment 17. The glass-ceramic article of Embodiment 1, further comprising grains having grains having a longest dimension of 150 nm or less.

Embodiment 18. A consumer electronic product, comprising a housing comprising a front surface, a back surface and side surfaces;

electrical components at least partially within the housing, the electrical components comprising at least a controller, a memory, and a display, the display at or adjacent the front surface of the housing; and a cover substrate disposed over the display, wherein at least one of a portion of the housing or the cover substrate comprises the glass-ceramic article of any of the preceding Embodiments.

Embodiment 19. A method of forming a glass-ceramic article, the method comprising:

heating a glass composition to a nucleation temperature to create a nucleated crystallizable glass composition;

heating the nucleated crystallizable glass composition to a crystallization temperature; and maintaining the crystallization temperature for a predetermined period of time to produce the glass-ceramic article, wherein the glass-ceramic article comprises:

a fracture toughness greater than 1.0 MPa√m; and a haze less than 0.2.

Embodiment 20. The method of Embodiment 19, further comprising: maintaining the nucleation temperature for a predetermined period of time to produce the nucleated crystallizable glass composition.

Embodiment 21. The method of Embodiment 20, wherein the period of time for maintaining the nucleation temperature is in a range from 1 minute to 6 hours.

Embodiment 22. The method of Embodiment 19, wherein the glass composition is not maintained at the nucleation temperature.

Embodiment 23. The method of any of Embodiments 19-22, further comprising:

heating the nucleated crystallizable glass composition to an intermediate temperature, wherein the intermediate temperature is greater than the nucleation temperature and less than the crystallization temperature; and heating the nucleated crystallizable glass composition from the intermediate temperature to the crystallization temperature.

Embodiment 24. The method of Embodiment 23, further comprising: maintaining the intermediate temperature for a predetermined period of time.

Embodiment 25. The method of Embodiment 23 or 24, wherein a heating rate for heating the nucleated crystallizable glass composition from the nucleation temperature to the intermediate temperature is different than the heating rate for heating the nucleated crystallizable glass composition from the intermediate temperature to the crystallization temperature.

Embodiment 26. The method of Embodiment 25, wherein the nucleating crystallizable glass composition is not maintained at the intermediate temperature.

Embodiment 27. The method of any of Embodiments 19-26, further comprising:

subjecting the glass-ceramic article to an ion-exchange treatment to create a compressive stress layer extending from a first surface of the glass-ceramic article to a depth of compression (DOC), wherein after the ion-exchange treatment the glass-ceramic article has a maximum central tension greater than 70 MPa and a stored tensile energy greater than 22 $J/m^2$.

Embodiment 28. The method of any of Embodiments 19-27, wherein the nucleation temperature is in a range from 550° C. to 650° C.

Embodiment 29. The method of any of Embodiments 19-28, wherein the heating to the nucleation temperature comprises heating from room temperature to the nucleation temperature at a heating rate in a range from 0.01° C./min to 50° C./min.

Embodiment 30. The method of any of Embodiments 19-29, wherein the crystallization temperature is in a range from 680° C. to 800° C.

Embodiment 31. The method of any of Embodiments 19-30, wherein the predetermined period of time for maintaining the crystallization temperature is in a range from 1 minute to 4 hours.

Embodiment 32. The method of any of Embodiments 19-31, wherein the heating to the crystallization temperature comprises heating from the nucleation temperature to the crystallization temperature at a heating rate in a range from 0.01° C./min to 50° C./min.

Embodiment 33. The method of any of Embodiments 19-32, further comprising:

in a first cooling stage, cooling the glass-ceramic article from the crystallization temperature to a first temperature at a first cooling rate; and in a second cooling stage, cooling the glass-ceramic article from the first temperature to a second temperature at a second cooling rate, wherein the first cooling rate is slower than the second cooling rate.

Embodiment 34. The method of any one of Embodiments 19-32, further comprising:

in a first cooling stage, cooling the glass-ceramic article from the crystallization temperature to a first temperature at a first cooling rate;

in an intermediate cooling stage, cooling the glass-ceramic article from the first temperature to a second temperature at second cooling rate;

in a second cooling stage, cooling the glass-ceramic article from the second temperature to a third temperature at a third cooling rate, wherein (i) the first cooling rate is slower than the second cooling rate and the third cooling rate and (ii) the second cooling rate is slower than the third cooling rate.

Embodiment 35. The method of any one of Embodiments 19-34, wherein the glass-ceramic has an optical retardance of less than 15 nm/mm of thickness.

Embodiment 36. A method of forming a glass-ceramic article, the method comprising:

heating a glass composition to a nucleation temperature $(T_N)$;

maintaining the nucleation temperature for a first predetermined period of time $(t_N)$ to produce a nucleated crystallizable glass composition;

heating the nucleated crystallizable glass composition to a crystallization temperature $(T_C)$; and maintaining the crystallization temperature for a second predetermined period of time $(t_C)$ to produce the glass-ceramic article, wherein $(103-0.260T_N+0.000203(T_N)^2-7.96t_N+0.1532(t_N)^2-0.019T_C-0.000008(T_C)^2-10.03t_C+0.00597T_N*t_N+0.00463t_N*T_C+0.01342T_C*t_C)<0.2.$ Embodiment 37. A method for controlling the haze of a glass-ceramic article, the method comprising:

selecting a nucleation temperature $(T_N)$, a first predetermined period of time $(t_N)$, a crystallization temperature $(T_C)$, and a second predetermined period of time $(t_C)$ so that $(103-0.260T_N+0.000203(T_N)^2-7.96t_N+0.1532(t_N)^2-0.019T_C-0.000008(T_C)^2-10.03t_C+0.00597T_N*t_N+0.00463t_N*T_C+0.01342T_C*t_C)<0.2.$ Embodiment 38. The method of Embodiment 37, further comprising:

heating a glass composition to the nucleation temperature $(T_N)$;

maintaining the nucleation temperature for the first predetermined period of time $(t_N)$ to produce a nucleated crystallizable glass composition;

heating the nucleated crystallizable glass composition to the crystallization temperature $(T_C)$; and maintaining the crystallization temperature for the second predetermined period of time $(t_C)$ to produce the glass-ceramic article.

What is claimed is:

1. A glass-ceramic article, comprising:

a residual glass phase that is less than or equal to 50 wt % of the glass-ceramic article;

a composition of the glass-ceramic article, based on 100 mol % of the glass-ceramic article, comprising:

greater than or equal to 1.7 mol % $ZrO_2$;

from 60 mol % to 72 mol % $SiO_2$;

from 0 mol % to 6 mol % $Al_2O_3$;

from 24 mol % to 32 mol % $Li_2O$;

from 0 mol % to 2 mol % $B_2O_3$;

from 0 mol % to 2 mol % $Na_2O$; and from 0 mol % to 2 mol % $K_2O$, wherein the glass-ceramic article comprises a molar ratio $Li_2O$ (mol %)/$R_2O$ (mol %) from greater than or equal to 0.85 to less than or equal to 1.00, where $R_2O$ is a total amount of $Li_2O$, $Na_2O$, and $K_2O$;

a first surface of the glass-ceramic article; and a compressive stress layer extending from the first surface of the glass-ceramic article to a depth of compression, wherein the glass-ceramic article has a maximum central tension greater than 90 MPa.

2. The glass-ceramic article of claim 1, further comprising a stored tensile energy greater than 22 J/m².

3. The glass-ceramic article of claim 2, wherein the stored tensile energy is no more than 100 J/m².

4. The glass-ceramic article of claim 3, wherein the depth of compression is at least 0.05 mm and no more than 0.6 mm.

5. The glass-ceramic article of claim 4, further comprising a thickness of the glass-ceramic article, wherein the thickness is at least 0.2 mm and no more than 4 mm.

6. The glass-ceramic article of claim 5, wherein the $ZrO_2$ is greater than or equal to 1.7 mol % and less than or equal to 4.5 mol % $ZrO_2$.

7. The glass-ceramic article of claim 6, wherein the molar ratio $Li_2O$ (mol %)/$R_2O$ (mol %) is from greater than or equal to 0.95 to less than or equal to 0.99.

8. The glass-ceramic article of claim 7, further comprising $P_2O_5$ from 0.7 mol % to 2.2 mol %.

9. The glass-ceramic article of claim 1, further comprising a haze less than 0.2.

10. The glass-ceramic article of claim 9, further comprising a fracture toughness greater than 1.0 MPa√m.

11. The glass-ceramic article of claim 1, wherein the haze is less than 0.18.

12. The glass-ceramic article of claim 1, further comprising average transmittance of the glass-ceramic article at or exceeding 85% per mm over a wavelength range from 450 nm to 600 nm, including surface reflection losses of light.

13. The glass-ceramic article of claim 1, wherein the composition comprises from 65 mol % to 72 mol % $SiO_2$.

14. A glass-ceramic article, comprising:

a residual glass phase that is less than or equal to 50 wt % of the glass-ceramic article;

a composition of the glass-ceramic article, based on 100 mol % of the glass-ceramic article, comprising:

greater than or equal to 1.7 mol % $ZrO_2$;

from 60 mol % to 72 mol % $SiO_2$;

from 0 mol % to 6 mol % $Al_2O_3$;

from 24 mol % to 32 mol % $Li_2O$;

from 0 mol % to 2 mol % $B_2O_3$;

from 0 mol % to 2 mol % $Na_2O$; and from 0 mol % to 2 mol % $K_2O$, wherein the glass-ceramic article comprises a molar ratio $Li_2O$ (mol %)/$R_2O$ (mol %) from greater than or equal to 0.85 to less than or equal to 1.00, where $R_2O$ is a total amount of $Li_2O$, $Na_2O$, and $K_2O$;

a first surface of the glass-ceramic article;

a compressive stress layer extending from the first surface of the glass-ceramic article to a depth of compression; and a stored tensile energy greater than 22 $J/m^2$.

15. The glass-ceramic article of claim 14, wherein the stored tensile energy is no more than 100 $J/m^2$.

16. The glass-ceramic article of claim 14, further comprising a haze less than 0.2.

17. A glass-ceramic article, comprising:

a residual glass phase that is less than or equal to 50 wt % of the glass-ceramic article;

a composition of the glass-ceramic article, based on 100 mol % of the glass-ceramic article, comprising:

greater than or equal to 1.7 mol % $ZrO_2$;

from 60 mol % to 72 mol % $SiO_2$;

from 0 mol % to 6 mol % $Al_2O_3$;

from 24 mol % to 32 mol % $Li_2O$;

from 0 mol % to 2 mol % $B_2O_3$;

from 0 mol % to 2 mol % $Na_2O$; and from 0 mol % to 2 mol % $K_2O$, wherein the glass-ceramic article comprises a molar ratio $Li_2O$ (mol %)/$R_2O$ (mol %) from greater than or equal to 0.85 to less than or equal to 1.00, where $R_2O$ is a total amount of $Li_2O$, $Na_2O$, and $K_2O$;

a first surface of the glass-ceramic article;

optical retardance at room temperature of less than 40 nm per mm of thickness measured using a grey-field polari-scope GFP-1400 photoelastic stress measurement system.

18. The glass-ceramic article of claim 17, further comprising a first surface of the glass-ceramic article, and a compressive stress layer extending from the first surface of the glass-ceramic article to a depth of compression, wherein the depth of compression is at least 0.05 mm and no more than 0.6 mm.

19. The glass-ceramic article of claim 18, further comprising a thickness of the glass-ceramic article, wherein the thickness is at least 0.2 mm and no more than 4 mm.

20. The glass-ceramic article of claim 19, further comprising a stored tensile energy greater than 22 $J/m^2$; and a haze less than 0.2.

* * * * *